United States Patent
Nishiyama et al.

(10) Patent No.: US 9,306,214 B2
(45) Date of Patent: Apr. 5, 2016

(54) LITHIUM ION BATTERY

(71) Applicant: Hitachi Chemical Company, Ltd., Chiyoda-ku, Tokyo (JP)

(72) Inventors: Hiroo Nishiyama, Tokyo (JP); Takefumi Okumura, Tokyo (JP); Takayuki Kimura, Tokyo (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 14/381,850

(22) PCT Filed: Feb. 19, 2013

(86) PCT No.: PCT/JP2013/053979
§ 371 (c)(1),
(2) Date: Aug. 28, 2014

(87) PCT Pub. No.: WO2013/129182
PCT Pub. Date: Sep. 6, 2013

(65) Prior Publication Data
US 2015/0017499 A1   Jan. 15, 2015

(30) Foreign Application Priority Data
Feb. 29, 2012   (JP) ................... 2012-043713

(51) Int. Cl.
*H01M 4/36*    (2006.01)
*H01M 4/131*   (2010.01)
(Continued)

(52) U.S. Cl.
CPC ............. *H01M 4/364* (2013.01); *H01M 4/131* (2013.01); *H01M 4/136* (2013.01); *H01M 4/1391* (2013.01); *H01M 4/1397* (2013.01);
(Continued)

(58) Field of Classification Search
None
See application file for complete search history.

(56) References Cited

U.S. PATENT DOCUMENTS 6,447,946 B1   9/2002   Nakai et al.
2006/0216601 A1*   9/2006   Komiyama et al. ........ 429/231.1
(Continued)

FOREIGN PATENT DOCUMENTS

CN   101388459 A   3/2009
CN   101577324 A   11/2009
(Continued)

OTHER PUBLICATIONS

International Search Report (PCT/ISA/210) dated May 21, 2013 with English translation (five pages).
(Continued)

*Primary Examiner* — Gregg Cantelmo
(74) *Attorney, Agent, or Firm* — Crowell & Moring LLP

(57) ABSTRACT

In a lithium ion battery having a discharge capacity of 30 Ah or more and 125 Ah or less, the positive electrode composite has the following configuration: The positive electrode composite contains a mixed active material of layered lithium nickel manganese cobalt composite oxide (NMC) and olivine lithium iron phosphate (LFP), a density of the positive electrode composite is 2.0 g/cm$^3$ or more and 2.6 g/cm$^3$ or less, and an application quantity of the positive electrode composite is 100 g/m$^2$ or more and 200 g/m$^2$ or less. Furthermore, a weight ratio (NMC/LFP) of the mixed active materials is set to 10/90 or more and 60/40 or less. Alternatively, when a discharge capacity is defined as X and the weight ratio is defined as Y, the relation of $Y \leq -0.0067X + 1.84$ ($30 \leq X \leq 125$) is satisfied.

4 Claims, 2 Drawing Sheets

Figure 1:
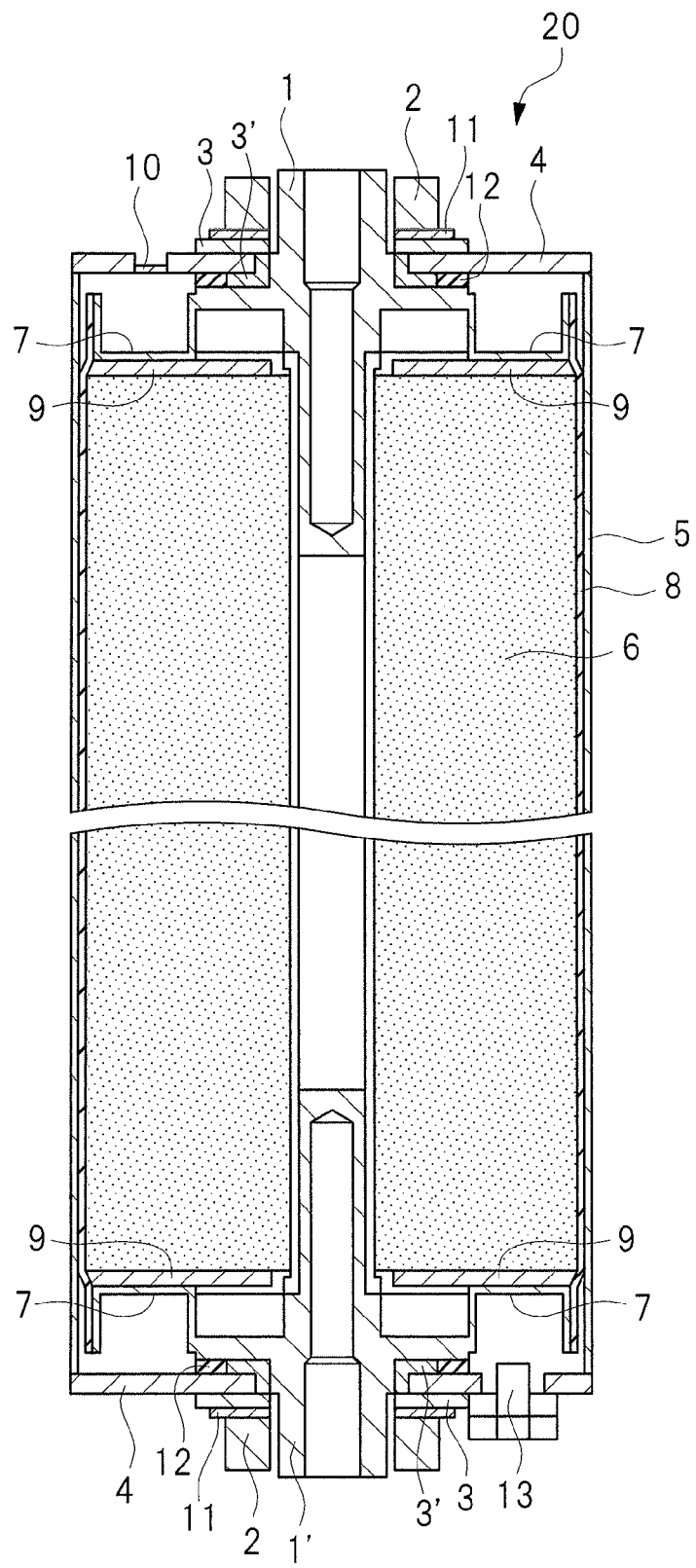

(51) Int. Cl.
*H01M 4/136* (2010.01)
*H01M 4/1391* (2010.01)
*H01M 4/1397* (2010.01)
*H01M 4/505* (2010.01)
*H01M 4/525* (2010.01)
*H01M 4/58* (2010.01)
*H01M 10/0587* (2010.01)
*H01M 10/0525* (2010.01)
*H01M 10/04* (2006.01)
*H01M 4/02* (2006.01)

(52) U.S. Cl.
CPC .............. *H01M 4/366* (2013.01); *H01M 4/505* (2013.01); *H01M 4/525* (2013.01); *H01M 4/5825* (2013.01); *H01M 10/0431* (2013.01); *H01M 10/0525* (2013.01); *H01M 10/0587* (2013.01); *H01M 2004/021* (2013.01); *H01M 2220/30* (2013.01); *Y02E 60/122* (2013.01); *Y02P 70/54* (2015.11)

(56) References Cited

U.S. PATENT DOCUMENTS

| | | | |
|---|---|---|---|
| 2007/0254209 | A1 | 11/2007 | Baba et al. |
| 2010/0248038 | A1 | 9/2010 | Takami et al. |
| 2013/0059199 | A1 | 3/2013 | Hara et al. |
| 2013/0346000 | A1* | 12/2013 | Joe et al. ..................... 702/63 |

FOREIGN PATENT DOCUMENTS

| | | | |
|---|---|---|---|
| JP | 3433695 | B2 | 8/2003 |
| JP | 2004-47180 | A | 2/2004 |
| JP | 3541723 | B2 | 7/2004 |
| JP | 2007-250433 | A | 9/2007 |
| JP | 2007-317534 | A | 12/2007 |
| JP | 2007-317539 | A | 12/2007 |
| JP | 2010-225486 | A | 10/2010 |
| JP | 2011-86405 | A | 4/2011 |

OTHER PUBLICATIONS

Japanese-language Written Opinion (PCT/ISA/237) dated May 21, 2013 (four pages).

Chinese Office Action issued in counterpart Chinese Application No. 201380011621.3 dated Dec. 16, 2015 (six pages).

\* cited by examiner

LITHIUM ION BATTERY

TECHNICAL FIELD

The present invention relates to a lithium ion battery.

BACKGROUND ART

The lithium ion battery is a secondary battery with high energy density, and is used for a power source of portable devices such as a notebook computer and a mobile phone by taking advantage of its characteristics. There are various types in the shape of the lithium ion battery, and a wound-type structure of a positive electrode, a negative electrode, and a separator is adopted in a cylindrical lithium ion battery. For example, a positive electrode material and a negative electrode material are each applied to two sheets of belt-like metal foils, a separator is interposed therebetween, and a stacked body thus obtained is wound spirally, thereby forming a wound group. This wound group is housed in a cylindrical battery can used as a battery container, and is sealed after electrolytic solution is poured therein, so that a cylindrical lithium ion battery is formed.

Regarding the cylindrical lithium ion battery, an 18650 type lithium ion battery has been widespread as a lithium ion battery for consumer use. An outer size of the 18650 type lithium ion battery is as small as about 18 mm in diameter and about 65 mm in height. Lithium cobalt oxide characterized by a large capacity and long life is mainly used for a positive electrode as an active material of the 18650 type lithium ion battery, and the battery capacity is approximately 1.0 Ah to 2.0 Ah (3.7 Wh to 7.4 Wh) in general.

In recent years, it is expected that the lithium ion battery is developed not only for the consumer use in portable devices or the like, but also for the large-scale energy storage system use for natural power sources such as photovoltaic power generation and wind power generation. The large-scale energy storage systems require an amount of electric power per system in an order of magnitude of several megawatts/hour (MWh).

For example, Patent Document 1 listed below discloses a cylindrical lithium ion battery which includes, in a cylindrical battery container, an electrode wound group in which a positive electrode, a negative electrode, and a separator are wound. This battery has a discharge capacity of 77.04 Ah or larger, and a positive electrode, in which a specified quantity of an active material mixture containing lithium manganese composite oxide is applied to both surfaces of a current collector, is used therein.

In addition, Patent Document 2 listed below discloses a cylindrical lithium ion battery which includes, in a cylindrical battery container, an electrode wound group in which a positive electrode, a negative electrode, and a separator are wound. This battery has a battery capacity of 3 Ah or larger and an output of 400 W or higher. Also, a positive electrode active material mixture containing a lithium manganese composite oxide is used for the positive electrode, a negative electrode active material mixture containing amorphous carbon is used for the negative electrode, and a mixed solvent containing ethylene carbonate, dimethyl carbonate, and diethyl carbonate is used as a solvent of an electrolytic solution.

PRIOR ART DOCUMENTS

Patent Documents

Patent Document 1: Japanese Patent No. 3541723
Patent Document 2: Japanese Patent No. 3433695

SUMMARY OF THE INVENTION

Problems to be Solved by the Invention

However, in the case where the above-mentioned 18650 type lithium ion battery is used for the large-scale energy storage system mentioned above, approximately one million batteries are needed.

Usually, as for a lithium ion battery, a cell controller is mounted for every one battery, and a state of the battery is detected. Therefore, in a system in which a large number of batteries are used, the number of needed cell controllers also increases, resulting in the large cost increase.

Therefore, it is desired that a capacity per battery is increased to reduce the number of batteries and cell controllers which are needed for the system.

In this way, when a capacity of a battery is increased, the amount of energy capable of being stored in the battery is also increased, and therefore, safety guarantee in a non-steady state arises as a problem to be solved. For example, even when the above-mentioned 18650 type lithium ion battery is simply enlarged to secure the battery capacity, the safety is not always secured, and comprehensive studies for constituent materials of the battery including a positive electrode, a negative electrode, and a separator are necessary.

Further, the large-scale energy storage system is also required to be appropriately responsive to the rapid load fluctuation, and a high-input and high-output lithium ion battery which satisfies high input/output characteristics is desired.

Accordingly, an object of the present invention is to provide a high-input and high-output lithium ion battery having a large capacity, while guaranteeing the safety.

The above and other objects and novel characteristics of the present invention will be apparent from the description of the present specification and the accompanying drawings.

Means for Solving the Problems

In a lithium ion battery having an electrode wound group in which a positive electrode, a negative electrode, and a separator are wound and an electrolytic solution provided in a battery container, a discharge capacity X of the battery being 30 Ah or more and 125 Ah or less, the positive electrode has a current collector and a positive electrode composite applied to both surfaces of the current collector, and the positive electrode composite has following configuration. That is, the positive electrode composite contains a mixed active material of layered lithium nickel manganese cobalt composite oxide (NMC) and olivine lithium iron phosphate (LFP), a density of the positive electrode composite is 2.0 g/cm$^3$ or more and 2.6 g/cm$^3$ or less, and an application quantity of the positive electrode composite is 100 g/m$^2$ or more and 200 g/m$^2$ or less. Furthermore, the discharge capacity X and a weight ratio Y (NMC/LFP) between the layered lithium nickel manganese cobalt composite oxide (NMC) and the olivine lithium iron phosphate (LFP) satisfy a following relational expression 1:

$$Y < -0.0067X + 1.84 (30 \leq X \leq 125) \quad \text{(relational expression 1)}.$$

In a lithium ion battery having an electrode wound group in which a positive electrode, a negative electrode, and a separator are wound and an electrolytic solution provided in a battery container, a discharge capacity of the battery being 30 Ah or more, the positive electrode has a current collector and a positive electrode composite applied to both surfaces of the current collector, and the positive electrode composite has following configuration. That is, the positive electrode composite contains a mixed active material of layered lithium nickel manganese cobalt composite oxide (NMC) and olivine lithium iron phosphate (LFP), a density of the positive electrode composite is 2.0 g/cm³ or more and 2.6 g/cm³ or less, and an application quantity of the positive electrode composite is 100 g/m² or more and 200 g/m² or less. Furthermore, a weight ratio (NMC/LFP) between the layered lithium nickel manganese cobalt composite oxide (NMC) and the olivine lithium iron phosphate (LFP) is 10/90 or more and 60/40 or less.

The mixed active material is composed of a mixture of layered lithium nickel manganese cobalt composite oxide represented by a following composition formula (Chem. 1) and olivine lithium iron phosphate having an olivine crystal structure and represented by a following composition formula (Chem. 2), that is:

  (Chem. 1)

(where, M is at least one element selected from a group including Ti, Zr, Nb, Mo, W, Al, Si, Ga, Ge, and Sn, and $-0.15<\delta<0.15$, $0.1<x\leq0.5$, $0.6<x+y+z\leq1.0$, and $0\leq z\leq0.1$ are satisfied); and

  (Chem. 2)

(where, M' is at least one transition metal element, and $0\leq w\leq0.5$ is satisfied).

Effects of the Invention

The effects obtained by typical embodiments of the invention disclosed in the present application will be briefly described below.

According to the present invention, it is possible to provide a high-input and high-output lithium ion battery having a large capacity, while guaranteeing the safety.

BRIEF DESCRIPTIONS OF THE DRAWINGS

Figure 2:
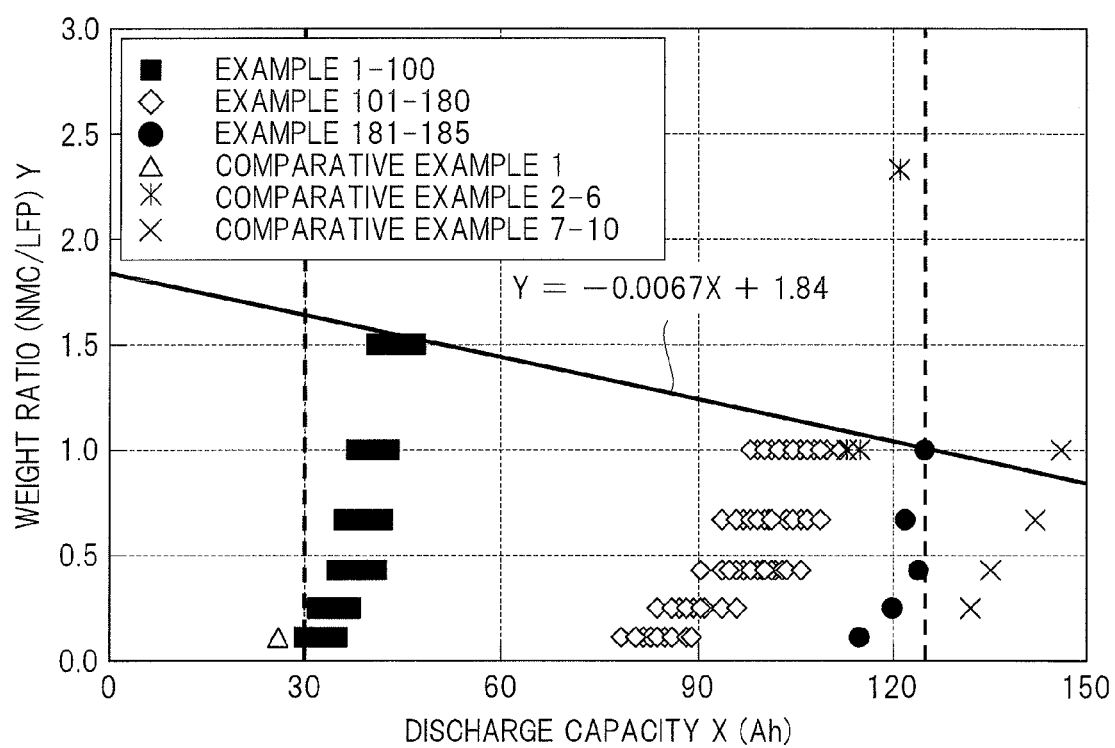

FIG. 1 is a cross-sectional view of a lithium ion battery of the present embodiment; and FIG. 2 is a graph showing the relation of a discharge capacity and a weight ratio of active materials.

BEST MODE FOR CARRYING OUT THE INVENTION

In the case where a range is indicated as A to B in the following embodiment, it is assumed to be A or more and B or less except for the cases where it is clearly indicated in particular.

Embodiment

First, summary of a lithium ion battery will be briefly described. The lithium ion battery has a positive electrode, a negative electrode, a separator, and an electrolytic solution in a battery container. The separator is disposed between the positive electrode and the negative electrode. The positive electrode, the negative electrode, and the separator are wound to form an electrode wound group and are disposed in the battery container in the wound state.

When the lithium ion battery is charged, a battery charger is connected between the positive electrode and the negative electrode. At the time of the charging, lithium ions inserted into a positive electrode active material are desorbed, and released into the electrolytic solution. The lithium ions released into the electrolytic solution move in the electrolytic solution, pass through a separator made of fine porous films, and reach the negative electrode. The lithium ions which have reached the negative electrode are inserted into a negative electrode active material which constitutes the negative electrode.

When the battery is discharged, an external load is connected between the positive electrode and the negative electrode. At the time of the discharging, lithium ions which have been inserted into the negative electrode active material are desorbed and released into the electrolytic solution. At this time, electrons are released from the negative electrode. Then, the lithium ions released into the electrolytic solution move in the electrolytic solution, pass through the separator made of fine porous films, and reach the positive electrode. The lithium ions which have reached the positive electrode are inserted into the positive electrode active material which constitutes the positive electrode. At this time, by the lithium ions being inserted into the positive electrode active material, electrons flow into the positive electrode. In this way, discharging is performed by the electrons moving to the positive electrode from the negative electrode.

As described above, by inserting and desorbing lithium ions between the positive electrode active material and the negative electrode active material, the battery can be charged and discharged. Note that a configuration example of the actual lithium ion battery will be described later (for example, see FIG. 1).

Next, the positive electrode, the negative electrode, the electrolytic solution, the separator, and other constituent parts which are constituent elements of the lithium ion battery of the present embodiment will be sequentially described below.

1. Positive Electrode

The present embodiment includes a positive electrode described below as a positive electrode applicable to the high-input and high-output lithium ion battery having a large capacity. The positive electrode (positive electrode plate) of the present embodiment is made up of a current collector and a positive electrode composite (mixture) formed on the current collector. The positive electrode composite is a layer which is provided on the current collector and contains at least the positive electrode active material, and in the present embodiment, it contains a mixed active material of layered lithium nickel manganese cobalt composite oxide (NMC) and olivine lithium iron phosphate (LFP). This positive electrode composite is formed (applied) to, for example, both surfaces of the current collector.

In the lithium ion battery, under such abnormal conditions as <1> at the time of overcharging due to a malfunction of a charge control system, <2> at the time of the battery crash due to an unexpected impact or the like, <3> at the time of penetration of a foreign matter, and <4> at the time of external short-circuit, a large current charging state or a large current discharging state continues in some cases. In such cases, due to a rapid and continuous chemical reaction of the electrolytic solution and the active material in the positive electrode, gas is sometimes generated and an internal pressure of the battery container is increased.

In general, in order to prevent the increase of the internal pressure in the battery container, the cylindrical lithium ion battery is provided with an internal pressure reduction mechanism such as a safety valve or a cleavage valve which makes the gas emitted to the outside of the container when a predetermined internal pressure is reached. However, in the case where the above-mentioned rapid and continuous chemical reaction occurs, breakages (including crack, swelling, and ignition) of the battery container may occur even if the internal pressure reduction mechanism is provided.

In contrast, in the present embodiment, the positive electrode composite containing the layered lithium nickel manganese cobalt composite oxide (NMC) and the olivine lithium iron phosphate (LFP) is used. Also, a positive electrode composite density is set to 2.0 g/cm³ or more and 2.6 g/cm³ or less, a positive electrode composite application quantity is set to 100 g/m² or more and 200 g/m² or less, and furthermore, NMC/LFP corresponding to a weight ratio (mixing ratio) of the layered lithium nickel manganese cobalt composite oxide (NMC) and the olivine lithium iron phosphate (LFP) is set to 10/90 or more and 60/40 or less. In this manner, it is possible to achieve the larger capacity and higher input and output in the battery, while guaranteeing the safety even in abnormal conditions. Note that the above-mentioned weight ratio is sometimes referred to simply as "weight ratio of active materials".

In the case where the positive electrode composite density is less than 2.0 g/cm³, there is fear that a resistance of the positive electrode is increased and input/output characteristics are deteriorated. On the other hand, when the positive electrode composite density exceeds 2.6 g/cm³, there is a concern about the safety deterioration, and there is fear that enhancement of other safety measures is needed.

In the case where the positive electrode composite application quantity is less than 100 g/m², there is fear that the amount of the active material which contributes to charging and discharging is decreased and an energy density of the battery is lowered. On the other hand, when the positive electrode composite application quantity exceeds 200 g/m², there is fear that a resistance of the positive electrode composite is increased and input/output characteristics are deteriorated.

In the case where the weight ratio (NMC/LFP) of the active materials is less than 10/90, there is fear that the energy density of the battery is lowered. On the other hand, when the weight ratio (NMC/LFP) of the active materials exceeds 60/40, there is a concern about the safety deterioration, and there is fear that enhancement of other safety measures is needed.

As described above, regarding the positive electrode composite, the positive electrode composite density, the positive electrode composite application quantity, and the weight ratio (NMC/LFP) of the active materials are set within the ranges mentioned above. By this means, even in the lithium ion battery having a large capacity, that is, a discharge capacity of 30 Ah or more, a high-input and high-output battery having a high energy density can be realized, while guaranteeing the safety.

In addition, by forming the positive electrode composite so that a discharge capacity X and a weight ratio (NMC/LFP) Y of the active materials satisfy the following relational expression 1, even in the lithium ion battery having a large capacity, that is, the discharge capacity X of 30 Ah or more and 125 Ah or less, a high-input and high-output battery having a high energy density can be realized, while guaranteeing the safety.

$$Y < -0.0067X + 1.84 \text{ (where } 30 \leq X \leq 125) \quad \text{(relational expression 1)}$$

Further, as the layered lithium nickel manganese cobalt composite oxide (NMC), it is preferred to use the material represented by the following composition formula (Chem. 1).

$$Li_{(1+\delta)}Mn_xNi_yCo_{(1-x-y-z)}M_zO_2 \quad \text{(Chem. 1)}$$

In the above-mentioned composition formula (Chem. 1), (1+δ) denotes a composition ratio of Li (lithium), x denotes a composition ratio of Mn (manganese), y denotes a composition ratio of Ni (nickel), and (1-x-y-z) denotes a composition ratio of Co (cobalt). Also, z denotes a composition ratio of an element M. The composition ratio of O (oxygen) is 2.

The element M is at least one element selected from a group including Ti (titanium), Zr (zirconium), Nb (niobium), Mo (molybdenum), W (tungsten), Al (aluminum), Si (silicon), Ga (gallium), Ge (germanium), and Sn (tin).

Here, $-0.15 < \delta < 0.15$, $0.1 < x \leq 0.5$, $0.6 < x+y+z \leq 1.0$, and $0 \leq z \leq 0.1$ are satisfied.

Also, as the olivine lithium iron phosphate (LFP), it is preferred to use the material having an olivine crystal structure and represented by the following composition formula (Chem. 2).

$$LiFe_{1-w}M'_wPO_4 \quad \text{(Chem. 2)}$$

In the above-mentioned composition formula (Chem. 2), (1-w) denotes a composition ratio of Fe (iron), and w denotes a composition ratio of the element M'. The composition ratio of Li (lithium) is 1, the composition ratio of P (phosphorus) is 1, and the composition ratio of O (oxygen) is 4.

The element M' is at least one transition metal element.

Here, $0 \leq w \leq 0.5$ is satisfied.

The compound represented by the composition formula (Chem. 2) above is lithium transition metal phosphate compound obtained by substituting a part of Fe of lithium iron phosphate by a transition metal element. As the transition metal element, any of one or two or more transition metal elements other than Fe can be used in combination. Preferable examples of the transition metal element include Co, Mn, V and others. Also, in order to enhance the conductivity, olivine lithium iron phosphate containing carbon is preferably used.

As described above, by using a mixture of the layered lithium nickel manganese cobalt composite oxide (NMC) and the olivine lithium iron phosphate (LFP) as the active material for the positive electrode (positive electrode active material), even in the case of increasing the capacity, the stability of the positive electrode at the time of charging can be enhanced and the heat generation can be suppressed. As the result, it is possible to provide a battery excellent in the safety. Furthermore, it is also possible to improve charging/discharging cycle characteristics and preservation characteristics.

When the olivine lithium iron phosphate (LFP) is used as the positive electrode active material, since the change in crystal structure caused by charging/discharging is small, the characteristic deterioration after repeating the charging and discharging many times can be reduced, and the cycle characteristics can be improved. Consequently, it is possible to extend the battery life.

Also, oxygen atoms in the crystal of the olivine lithium iron phosphate (LFP) stably exist owing to a covalent bond with P (phosphorus). Therefore, even if the battery is exposed to the high-temperature environment, oxygen is less likely to be released from the positive electrode active material, and the safety of the battery can be enhanced.

As described above, the olivine lithium iron phosphate (LFP) has useful characteristics, but the olivine lithium iron phosphate (LFP) itself has small theoretical capacity, and a density thereof is also small. Therefore, in the case where the battery is constituted by using only the olivine lithium iron phosphate (LFP) as the positive electrode active material, it is difficult to increase the battery capacity (discharge capacity). On the other hand, the layered lithium nickel manganese cobalt composite oxide (NMC) has a large theoretical capacity, and has the theoretical capacity equivalent to that of LiCoO$_2$ which is widely used as the positive electrode active material of the lithium ion battery.

Therefore, in the present embodiment, the layered lithium nickel manganese cobalt composite oxide (NMC) and the olivine lithium iron phosphate (LFP) are used together, and the positive electrode composite density is increased, whereby it becomes possible to provide a battery which has a large capacity and is excellent in safety. In addition, it becomes possible to provide a battery which is excellent also in preservation characteristics and charging/discharging cycle characteristics.

Hereinafter, the positive electrode composite and the current collector will be described in detail. The positive electrode composite contains a positive electrode active material and a binding material or the like, and is formed on the current collector. The forming method thereof is not particularly limited, and for example, it is formed in the following manner. That is, the positive electrode active material, the binding material, and other materials such as a conducting material and a thickening agent which are used as necessary are mixed in a dry process and formed into a sheet-like shape, and this is pressure-bonded to the current collector (dry process). Alternatively, the positive electrode active material, the binding material, and other materials such as a conducting material and a thickening agent which are used as necessary are dissolved or dispersed in a dispersing solvent to be a slurry, and this is applied to the current collector and then dried (wet method).

As the positive electrode active material, as mentioned above, the layered lithium nickel manganese cobalt composite oxide (NMC) and the olivine lithium iron phosphate (LFP) are used. These are used in a powder (grain) state, and are mixed with each other.

To the surface of this positive electrode active material, a substance having a different composition from the substance constituting the positive electrode active material to be the main constituent may be adhered. Examples of the surface adherence substances include oxides such as aluminum oxide, silicon oxide, titanium oxide, zirconium dioxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, carbonates such as lithium carbonate, calcium carbonate, and magnesium carbonate, carbon, and others.

Examples of an adhesion method of the surface adherence substance include the following methods. For example, the positive electrode active material is added to a fluid in which a surface adherence substance has been dissolved or suspended in a solvent, thereby impregnating and adding the surface adherence substance to the positive electrode active material. Thereafter, the positive electrode active material in which the surface adherence substance has been impregnated is dried. Alternatively, the positive electrode active material is added to a fluid in which a precursor of the surface adherence substance has been dissolved or suspended in a solvent, thereby impregnating and adding the precursor of the surface adherence substance to the positive electrode active material. Thereafter, the positive electrode active material in which the precursor of the surface adherence substance has been impregnated is heated. Also, a fluid in which a precursor of the surface adherence substance and a precursor of the positive electrode active material have been dissolved or suspended in a solvent is sintered. By these methods, it is possible to make the surface adherence substance adhere to the surface of the positive electrode active material.

The amount of the surface adherence substance is preferably set within the following range relative to a weight of the positive electrode active material. The lower limit of the range is preferably 0.1 ppm or more, more preferably 1 ppm or more, and still more preferably 10 ppm or more. The upper limit is preferably 20% or less, more preferably 10% or less, and still more preferably 5% or less.

The oxidation reaction of a nonaqueous electrolytic solution on a surface of the positive electrode active material can be suppressed by the surface adherence substance, and the battery life can be extended. However, in the case where the adhesion amount thereof is too little, the above-mentioned effect does not fully appear, and in the case where it is too much, a resistance may increase because the surface adherence substance interrupts the movement of lithium ions. Therefore, it is preferred that the amount is set within the above-mentioned range.

As the particles of the positive electrode active materials of the layered lithium nickel manganese cobalt composite oxide (NMC) and the olivine lithium iron phosphate (LFP), those in a massive form, a polyhedron shape, a spherical shape, an oval sphere shape, a tabular shape, a needle shape, a pillar shape or the like are used. Among them, those having primary particles which are condensed to form a secondary particle, the shape of the secondary particle being a spherical shape or an oval sphere shape, are preferred.

In an electrochemical device like a battery, an active material in an electrode swells and contracts in association with the charging and discharging thereof, and therefore, deteriorations such as destruction of the active material and disconnection of a conducting path due to the stress thereof tend to occur. Therefore, those having primary particles which are condensed to form a secondary particle are preferably used compared with those of a single particle having only primary particles because the stress of the swelling and contraction can be eased and the above-mentioned deteriorations can be prevented. Also, particles of spherical shape or oval sphere shape are preferably used compared with particles having axial orientation such as the tabular shape because the orientation in the electrode decreases and the swelling and contraction of the electrode at the time of charging and discharging are reduced. Furthermore, such particles are preferred because they are uniformly mixed with other materials such as a conducting material at the time of forming the electrode.

Regarding a median diameter d50 of particles of the positive electrode active materials of the layered lithium nickel manganese cobalt composite oxide (NMC) and the olivine lithium iron phosphate (LFP) (the median diameter d50 of the secondary particle in the case where primary particles are condensed to form the secondary particle), the ranges thereof are as follows. That is, the lower limit of the range is 0.1 µm or more, preferably 0.5 µm or more, more preferably 1 µm or more, and still more preferably 3 µm or more, and the upper limit is 20 µm or less, preferably 18 µm or less, more preferably 16 µm or less, and still more preferably 15 µm or less. In a range less than the above-mentioned lower limit, there is fear that a tap density (filling characteristics) is lowered and a desired tap density is no longer acquired, and in a range exceeding the above-mentioned upper limit, there is a fear of causing the deterioration of the battery performance because spread of lithium ions in particles takes time. Furthermore, in the case of exceeding the above-mentioned upper limit, there is fear that mixing characteristics with other materials such as a binding material and a conducting material may be lowered at the time of forming the electrode. Therefore, when this mixture is slurried and then applied, the mixture cannot be uniformly applied and unevenness like stripes may be formed. Here, as the positive electrode active material, two or more kinds of those having different median diameters d50 may be mixed, thereby improving the tap density (filling characteristics). Note that the median diameter d50 can be calculated from a particle size distribution obtained by a laser diffraction and scattering method.

In the case where the primary particles are condensed to form the secondary particle, the ranges of an average particle diameter of the primary particle are as follows. That is, the lower limit of the range is 0.01 μm or more, preferably 0.05 μm or more, more preferably 0.08 μm or more, and still more preferably 0.1 μm or more, and the upper limit is 3 μm or less, preferably 2 μm or less, more preferably 1 μm or less, and still more preferably 0.6 μm or less. In the case of exceeding the above-mentioned upper limit, the formation of the secondary particle in a spherical shape becomes difficult, and there is fear that battery performances such as output characteristics are deteriorated due to the deterioration of the tap density (filling characteristics) and the deterioration of a specific surface area. In addition, in the range less than the above-mentioned lower limit, there is fear that the reversibility of charging and discharging is deteriorated due to the decrease in crystallinity.

The ranges of a BET specific surface area of particles of the positive electrode active materials of the layered lithium nickel manganese cobalt composite oxide (NMC) and the olivine lithium iron phosphate (LFP) are as follows. That is, the lower limit of the range is 0.2 $m^2/g$ or more, preferably 0.3 $m^2/g$ or more, and more preferably 0.4 $m^2/g$ or more, and the upper limit is 25 $m^2/g$ or less, preferably 20 $m^2/g$ or less, and more preferably 17 $m^2/g$ or less. In the range less than the above-mentioned lower limit, there is fear that the battery performance may be deteriorated. In the case of exceeding the above-mentioned upper limit, it becomes difficult to increase the tap density, and there is fear that mixing characteristics with other materials such as a binding material and a conducting material may be lowered. Therefore, there is fear that application characteristics in the case where this mixture is slurried and then applied may be deteriorated. The BET specific surface area is a specific surface area (area per gram) obtained by a BET method.

Conducting materials for the positive electrode include, for example, metal materials such as copper and nickel, graphites such as natural graphite and artificial graphite, carbon black such as acetylene black, and carbonaceous materials like amorphous carbon such as needle coke. Note that one material among these may be used independently, or two or more materials may be used in combination.

The ranges of the contained amount (additive amount, percentage, quantity) of the conducting material relative to a weight of the positive electrode composite are as follows. That is, the lower limit of the range is 0.01 wt. % or more, preferably 0.1 wt. % or more, and more preferably 1 wt. % or more, and the upper limit is 50 wt. % or less, preferably 30 wt. % or less, and more preferably 15 wt. % or less. In the range less than the above-mentioned lower limit, there is fear that conductivity becomes insufficient. In addition, in the case of exceeding the above-mentioned upper limit, there is fear that the battery capacity is lowered.

The binding material of the positive electrode active material is not particularly limited, and a material whose solubility and dispersibility for a dispersing solvent are suitable is selected in the case where the positive electrode composite is formed by an application method. Specific examples thereof include: resin-based polymers such as polyethylene, polypropylene, polyethylene terephthalate, polymethyl methacrylate, polyimide, aromatic polyamide, cellulose, and nitrocellulose; rubber-like polymers such as SBR (styrene-butadiene rubber), NBR (acrylonitrile-butadiene rubber), fluoro-rubber, isoprene rubber, butadiene rubber, and ethylene-propylene rubber; thermoplastic elastomer polymers such as styrene butadiene styrene block co-polymer or its hydrogen additive, EPDM (ethylene propylene diene terpolymer), styrene ethylene butadiene ethylene co-polymer, and styrene isoprene styrene block co-polymer or its hydrogen additive; soft resin polymers such as syndiotactic-1,2-polybutadiene, polyvinyl acetate, ethylene-vinyl acetate co-polymer, and propylene α-olefin co-polymer; fluorine-based polymers such as a polyvinylidene fluoride (PVdF), polytetrafluoroethylene, fluorinated polyvinylidene fluoride, polytetrafluoroethylene ethylene co-polymer, and polytetrafluoroethylene vinylidene fluoride co-polymer; and polymer compositions having the ion conductivity of an alkali metal ion (in particular, lithium ion). Note that one material among these may be used independently, or two or more materials may be used in combination. From a viewpoint of stability of the positive electrode, it is preferred to use fluorine-based polymers such as polyvinylidene fluoride (PVdF) and polytetrafluoroethylene vinylidene fluoride co-polymer.

The ranges of the contained amount (additive amount, percentage, quantity) of the binding material relative to a weight of the positive electrode composite are as follows. That is, the lower limit of the range is 0.1 wt. % or more, preferably 1 wt. % or more, and more preferably 3 wt. % or more, and the upper limit is 80 wt. % or less, preferably 60 wt. % or less, more preferably 40 wt. % or less, and still more preferably 10 wt. % or less. When the contained amount of the binding material is too low, there is fear that the positive electrode active material cannot be fully bound and a mechanical strength of the positive electrode becomes insufficient, with the result that battery performances such as cycle characteristics are deteriorated. Conversely, when too high, there is fear that the battery capacity and conductivity are lowered.

The layer formed on the current collector by using the above-mentioned wet method or dry method is preferably consolidated with a hand press, a roller press or the like in order to enhance a filling density of the positive electrode active material.

The material of the current collector for the positive electrode is not particularly limited, and specific examples thereof include: metal materials such as aluminum, stainless steel, plated nickel, titanium, tantalum; and carbonaceous materials such as carbon cloth and carbon paper. Among them, the metal material, especially aluminum is preferred.

The shape of the current collector is not particularly limited, and any materials processed into various shapes can be used. Specific examples thereof include: regarding metal materials, metal foil, metal column, metal coil, metal plate, metal thin film, expanded metal, punched metal, and foamed metal; and regarding carbonaceous materials, carbon plate, carbon thin film, and carbon cylindrical column. Among them, the metal thin film is preferably used. Note that the thin film may be formed into a mesh-like shape as appropriate. The thickness of the thin film is arbitrary, and the ranges thereof are as follows. That is, the lower limit of the range is 1 μm or more, preferably 3 μm or more, and more preferably 5 μm or more, and the upper limit is 1 mm or less, preferably 100 μm or less, and more preferably 50 μm or less. In the range less than the above-mentioned lower limit, sufficient strength required for the current collector cannot be obtained in some cases. In addition, in the case of exceeding the above-mentioned upper limit, there is fear that plasticity is lowered and processability is deteriorated.

2. Negative Electrode

The present embodiment includes a negative electrode described below as a negative electrode applicable to the high-input and high-output lithium ion battery having a large capacity. The negative electrode (negative electrode plate) of the present embodiment is made up of a current collector and a negative electrode composite (negative electrode mixture) formed on both surfaces of the current collector. The negative electrode composite contains a negative electrode active material which can electrochemically occlude and release lithium ions.

Examples of the negative electrode active material include carbonaceous materials, metal oxides such as tin oxide and silicon oxide, metal composite oxides, lithium simple substance, lithium alloy such as lithium aluminum alloy, and metals such as Sn and Si which can form alloy with lithium. One material among these may be used independently, or two or more materials may be used in combination. Among them, carbonaceous materials or lithium composite oxides are preferred from a viewpoint of the safety.

The metal composite oxide is not particularly limited as long as it can occlude and release lithium, and the oxide containing Ti (titanium) or Li (lithium) or both Ti and Li is preferred from a viewpoint of high current density charging/discharging characteristics.

As carbonaceous materials, amorphous carbon, natural graphite, composite carbonaceous materials obtained by forming a film formed on natural graphite by a dry CVD (Chemical Vapor Deposition) method or a wet spray method, artificial graphite obtained by sintering a resin material such as epoxy or phenol or a pitch-based material obtained from petroleum or coal as a raw material, and a carbonaceous material such as an amorphous carbon material can be used.

In addition, lithium metal which becomes capable of occluding and releasing lithium when forming a compound with lithium, silicon which becomes capable of occluding and releasing lithium when forming a compound with lithium and then being inserted in the crystal gap, and oxide or nitride of elements of the fourth group such as germanium and tin may be used.

In particular, carbonaceous materials have high conductivity and are excellent materials from an aspect of low-temperature characteristics and cycle stability. Among carbonaceous materials, materials with a wide interlayer spacing (d002) of carbon are preferred because they are excellent in rapid charging and discharging and low-temperature characteristics. However, since the capacity and charging and discharging efficiency of the material with a wide interlayer spacing (d002) of carbon are sometimes low in an early stage of charging, it is preferred to select the material whose interlayer spacing (d002) of carbon is 0.39 nm or less. The carbonaceous material like this is sometimes referred to as a quasi-anisotropic carbon.

Furthermore, as the negative electrode active material, carbonaceous materials having high conductivity such as graphite, amorphous material, activated carbon, or the like may be used in mixture. As the above-mentioned graphite materials, materials having characteristics described in the following (1) to (3) may be used.

(1) An R value that is an intensity ratio (ID/IG) between peak intensity (ID) in the range of 1300 to 1400 cm$^{-1}$ measured by a Raman spectroscopy spectrum and peak intensity (IG) in the range of 1580 to 1620 cm$^{-1}$ measured by a Raman spectroscopy spectrum is 0.2 or more and 0.4 or less.

(2) A half-value width Δ value of a peak in the range of 1300 to 1400 cm$^{-1}$ measured by a Raman spectroscopy spectrum is 40 cm$^{-1}$ or more and 100 cm$^{-1}$ or less.

(3) An intensity ratio X value (I(110)/I(004)) between a peak intensity (I(110)) of a (110) plane in X-ray diffraction and a peak intensity (I(004)) of a (004) plane is 0.1 or more and 0.45 or less.

By using the graphite under conditions like these as the negative electrode active material, the battery performance can be enhanced.

The negative electrode composite is formed on the current collector. The formation method thereof is not particularly limited, and the negative electrode composite is formed by using the dry method or the wet method in the same way as the positive electrode composite.

The above-mentioned negative electrode active material is used in a powder (grain) state.

The ranges of a median diameter d50 of particles of carbonaceous materials are as follows. That is, the lower limit of the range is 1 μm or more, preferably 3 μm or more, more preferably 5 μm or more, and still more preferably 7 μm or more, and the upper limit is 100 μm or less, preferably 50 μm or less, more preferably 40 μm or less, still more preferably 30 μm or less, and particularly preferably 25 μm or less. In the range less than the above-mentioned lower limit, there is fear that an irreversible capacity is increased and a loss of an initial battery capacity is caused. In addition, in the case of exceeding the above-mentioned upper limit, there is fear that a surface to which the negative electrode composite is applied becomes uneven at the time of forming the electrode, which poses a problem in the electrode formation.

The ranges of the BET specific surface area of particles of carbonaceous materials are as follows. That is, the lower limit of the range is 0.1 m$^2$/g or more, preferably 0.7 m$^2$/g or more, more preferably 1.0 m$^2$/g or more, and still more preferably 1.5 m$^2$/g or more, and the upper limit is 100 m$^2$/g or less, preferably 25 m$^2$/g or less, more preferably 15 m$^2$/g or less, and still more preferably 10 m$^2$/g or less. In the range less than the above-mentioned lower limit, there is fear that occlusion characteristics of lithium ions in the negative electrode tend to be lowered at the time of charging, and lithium is deposited on the surface of the negative electrode. In addition, in the case of exceeding the above-mentioned upper limit, there is fear that reactivity with nonaqueous electrolytic solution is increased, and generated gas in the vicinity of the negative electrode is increased.

A pore size distribution (relation between a pore size and a volume thereof) of particles of carbonaceous materials is obtained by a mercury porosimetry (mercury intrusion method). The pore volume can be obtained from this pore size distribution. The ranges of the pore volume of the particles of carbonaceous materials are as follows.

Regarding the pore volume $V_{(0.01\ to\ 1)}$ of particles of carbonaceous materials (total amount of a void in a particle, a depression due to irregularities of the particle surface, a void between contact surfaces of particles, and others in relation to the particle whose diameter is 0.01 μm or more and 1 μm or less), the ranges thereof are as follows. That is, the lower limit of the pore volume $V_{(0.01-1)}$ is 0.01 mL/g or more, preferably 0.05 mL/g or more, and more preferably 0.1 mL/g or more, and the upper limit is 0.6 mL/g or less, preferably 0.4 mL/g or less, and more preferably 0.3 mL/g or less.

In the case of exceeding the above-mentioned upper limit, there is fear that the binding material needed at the time of forming the electrode is increased. In the range less than the above-mentioned lower limit, there is fear that high current density charging/discharging characteristics are lowered, and furthermore, a relaxation effect of swelling and contraction of the electrode at the time of charging and discharging is lowered.

Also, regarding the pore volume $V_{(0.01\ to\ 1)}$ of particles of carbonaceous materials (total amount of a void in a particle, a depression due to irregularities of the particle surface, a void between contact surfaces of particles, and others in relation to the particle whose diameter is 0.01 µm or more and 100 µm or less), the ranges thereof are as follows. That is, the lower limit of the pore volume $V_{(0.01-100)}$ is preferably 0.1 mL/g or more, more preferably 0.25 mL/g or more, and still more preferably 0.4 mL/g or more, and the upper limit is 10 mL/g or less, preferably 5 mL/g or less, and more preferably 2 mL/g or less. In the case of exceeding the above-mentioned upper limit, there is fear that the binding material needed at the time of forming the electrode is increased. Also, in the range less than the above-mentioned lower limit, there is fear that the dispersibility to the binding material or thickening agent is lowered at the time of forming the electrode.

Further, the ranges of an average pore size of particles of carbonaceous materials are as follows. That is, the lower limit of the average pore size is preferably 0.05 µm or more, more preferably 0.1 µm or more, and still more preferably 0.5 µm or more, and the upper limit is 50 µm or less, preferably 20 µm or less, and more preferably 10 µm or less. In the case of exceeding the above-mentioned upper limit, there is fear that the binding material at the time of forming the electrode is increased. Also, in the range less than the above-mentioned lower limit, there is fear that high current density charging/discharging characteristics are lowered.

The ranges of the tap density of particles of carbonaceous materials are as follows. That is, the lower limit of the tap density is 0.1 g/cm$^3$ or more, preferably 0.5 g/cm$^3$ or more, more preferably 0.7 g/cm$^3$ or more, and still more preferably 1 g/cm$^3$ or more. The upper limit is preferably 2 g/cm$^3$ or less, more preferably 1.8 g/cm$^3$ or less, and still more preferably 1.6 g/cm$^3$ or less. In the range less than the above-mentioned lower limit, there is fear that the filling density of the negative electrode active material in the negative electrode composite is lowered, and the predetermined battery capacity cannot be secured. In addition, in the case of exceeding the above-mentioned upper limit, voids between negative electrode active materials in the negative electrode composite are decreased, and it becomes difficult to secure the conductivity between particles.

In addition, to a first carbonaceous material used as the negative electrode active material, a second carbonaceous material having properties different from that may be added as the conducting material. The above-mentioned properties represent one or more characteristics including an X-ray diffraction parameter, a median diameter, an aspect ratio, a BET specific surface area, an orientation ratio, a Raman R value, a tap density, a true density, a pore distribution, a circularity, and an ash content.

As a preferred configuration, there is a configuration in which a carbonaceous material whose particle size distribution on a volumetric basis is not bilaterally symmetrical about the median diameter serving as center is used as the second carbonaceous material (conducting material). Alternatively, there are a configuration in which a carbonaceous material whose Raman R value differs from that of the first carbonaceous material used as the negative electrode active material is used as the second carbonaceous material (conducting material), a configuration in which a carbonaceous material whose X-ray parameter differs from that of the first carbonaceous material used as the negative electrode active material is used as the second carbonaceous material (conducting material), and the like.

As the second carbonaceous material (conducting material), carbonaceous materials having high conductivity such as graphite, amorphous material, and activated carbon can be used. Specifically, graphites such as natural graphite and artificial graphite, carbon black such as acetylene black, and amorphous carbon such as needle coke can be used. One material among these may be used independently, or two or more materials may be used in combination. In this way, by adding the second carbonaceous material (conducting material), an effect such as the reduction of resistance of the electrode can be achieved.

Regarding the contained amount (additive amount, percentage, quantity) of the second carbonaceous material (conducting material), the ranges of the contained amount of the conducting material relative to a weight of the negative electrode composite are as follows. That is, the lower limit of the range is 1 wt. % or more, preferably 2 wt. % or more, and more preferably 3 wt. % or more, and the upper limit is 45 wt. % or less and preferably 40 wt. % or less. In the range less than the above-mentioned lower limit, effect of enhancing the conductivity is hard to be acquired, and in the case of exceeding the above-mentioned upper limit, there is fear that an initial irreversible capacity is increased.

The materials of the current collector for the negative electrode are not particularly limited, and specific examples thereof include metal materials such as copper, nickel, stainless steel, and nickel-plating steel. Among them, from a viewpoint of processability and cost, copper is preferred.

The shape of the current collector is not particularly limited, and materials processed into various shapes can be used. Specific examples thereof include metal foil, metal column, metal coil, metal plate, metal thin film, expanded metal, punched metal, and foamed metal. Among them, the metal thin film is preferred and the copper foil is more preferred. As the copper foil, there are a rolled copper foil formed by a rolling method and an electrolytic copper foil formed by an electrolytic method, and both are suitably used as the current collector.

Although the thickness of the current collector is not particularly limited, in the case where the thickness is less than 25 µm, the strength thereof can be enhanced by using strong copper alloy (phosphor bronze, copper-titanium alloy, Corson alloy, Cu—Cr—Zr alloy, or the like) instead of pure copper.

The configuration of the negative electrode composite formed by using the negative electrode active material is not particularly limited, and the ranges of the negative electrode composite density are as follows. That is, the lower limit of the negative electrode composite density is preferably 0.7 g/cm$^3$ or more, more preferably 0.8 g/cm$^3$ or more, and still more preferably 0.9 g/cm$^3$ or more, and the upper limit is 2 g/cm$^3$ or less, preferably 1.9 g/cm$^3$ or less, more preferably 1.8 g/cm$^3$ or less, and still more preferably 1.7 g/cm$^3$ or less.

In the case of exceeding the above-mentioned upper limit, particles of the negative electrode active material tend to be destroyed, and there is a fear of causing the increase in an initial irreversible capacity and the deterioration of high current density charging/discharging characteristics due to reduction of permeability of nonaqueous electrolytic solution into the vicinity of an interface between the current collector and the negative electrode active material. Also, in the range less than the above-mentioned lower limit, there is fear that a battery resistance is increased because the conductivity between the negative electrode active materials is lowered, and the capacity per volume is lowered.

The binding material of the negative electrode active material is not particularly limited as long as it is a material stable for the nonaqueous electrolytic solution and dispersing solvent used at the time of forming an electrode. Specific examples thereof include: resin-based polymers such as polyethylene, polypropylene, polyethylene terephthalate, polymethyl methacrylate, aromatic polyamide, cellulose, and nitrocellulose; rubber-like polymers such as SBR (styrene-butadiene rubber), isoprene rubber, butadiene rubber, fluoro-rubber, NBR (acrylonitrile-butadiene rubber), and ethylene-propylene rubber; styrene butadiene styrene block co-polymer or its hydrogen additive; thermoplastic elastomer polymers such as EPDM (ethylene propylene diene terpolymer), styrene ethylene butadiene styrene co-polymer, and styrene isoprene styrene block co-polymer or its hydrogen additive; soft resin polymers such syndiotactic-1,2-polybutadiene, polyvinyl acetate, ethylene-vinyl acetate co-polymer, and propylene α-olefin co-polymer; fluorine-based polymers such as polyvinylidene fluoride, polytetrafluoroethylene, fluorinated polyvinylidene fluoride, and polytetrafluoroethylene ethylenic co-polymer; and polymer compositions having an ion conductivity of alkali metal ion (in particular, lithium ion). One material among these may be used independently, or two or more materials may be used in combination.

The type of the dispersing solvent for forming the slurry is not particularly limited as long as the solvent can dissolve or disperse the negative electrode active material, the binding material, and the conducting material and the thickening agent which are used as necessary, and both aqueous solvent and organic solvent may be used. Examples of the aqueous solvent include water, mixed solvent of alcohol and water, and others, and examples of the organic solvent include N-methyl pyrrolidone (NMP), dimethylformamide, dimethylacetamide, methyl ethyl ketone, cyclohexanone, methyl acetate, methyl acrylate, diethyltriamine, N,N-dimethylamino propylamine, tetrahydrofuran (THF), toluene, acetone, diethylether, dimethylacetamide, hexamethylphosphoramide, dimethylsulfoxide, benzene, xylene, quinoline, pyridine, methylnaphthalene, hexane, and others. When using the aqueous solvent in particular, it is preferred to use a thickening agent. A dispersing agent or the like is added together with this thickening agent, and a slurry is produced by using a latex such as SBR. Note that one dispersing solvent among these may be used independently, or two or more dispersing solvents may be used in combination.

The ranges of the contained amount (additive amount, percentage, quantity) of the binding material relative to a weight of the negative electrode composite are as follows. That is, the lower limit of the range is preferably 0.1 wt. % or more, more preferably 0.5 wt. % or more, and still more preferably 0.6 wt. % or more. The upper limit is 20 wt. % or less, preferably 15 wt. % or less, more preferably 10 wt. % or less, and still more preferably 8 wt. % or less.

In the case of exceeding the above-mentioned upper limit, there is fear that a percentage of the binding material which does not contribute to the battery capacity is increased, and the battery capacity is lowered. In addition, in the range less than the above-mentioned lower limit, there is fear that a strength of the negative electrode composite is lowered.

In particular, the ranges of the contained amount of the binding material relative to a weight of the negative electrode composite in the case where the rubber-like polymer represented by SBR is used as a major component of the binding material are as follows. That is, the lower limit of the range is 0.1 wt. % or more, preferably 0.5 wt. % or more, and more preferably 0.6 wt. % or more, and the upper limit is 5 wt. % or less, preferably 3 wt. % or less, and more preferably 2 wt. % or less.

Also, the ranges of the contained amount of the binding material relative to a weight of the negative electrode composite in the case where the fluorine-based polymer represented by the polyvinylidene fluoride is used as a major component of the binding material are as follows. That is, the lower limit of the range is 1 wt. % or more, preferably 2 wt. % or more, and more preferably 3 wt. % or more, and the upper limit is 15 wt. % or less, preferably 10 wt. % or less, and more preferably 8 wt. % or less.

The thickening agent is used for adjusting the viscosity of the slurry. The thickening agent is not particularly limited, and specific examples thereof include carboxymethylcellulose, methylcellulose, hydroxymethylcellulose, ethylcellulose, polyvinyl alcohol, oxidized starch, phosphorylation starch, casein, salt thereof, and the like. One material among these may be used independently, or two or more materials may be used in combination.

The ranges of the contained amount of the thickening agent relative to a weight of the negative electrode composite in the case of using the thickening agent are as follows. That is, the lower limit of the range is 0.1 wt. % or more, preferably 0.5 wt. % or more, and more preferably 0.6 wt. % or more, and the upper limit is 5 wt. % or less, preferably 3 wt. % or less, and more preferably 2 wt. % or less.

In the range less than the above-mentioned lower limit, there is fear that application properties of the slurry are lowered. Also, in the case of exceeding the above-mentioned upper limit, there is fear that a percentage of the negative electrode active material to the negative electrode composite is reduced, and the battery capacity is lowered and the resistance between negative electrode active materials is increased.

3. Electrolytic Solution

The electrolytic solution of the present embodiment is composed of lithium salt (electrolyte) and nonaqueous solvent which dissolves the lithium salt. As necessary, additives may be added.

The lithium salt is not particularly limited as long as it can be used as an electrolyte of nonaqueous electrolytic solution for lithium ion batteries, and examples thereof include inorganic lithium salt, fluorine-containing organic lithium salt, and oxalatoborate salt shown below.

Examples of the inorganic lithium salt include inorganic fluoride salts such as $LiPF_6$, $LiBF_4$, $LiAsF_6$, and $LiSbF_6$, perhalogen acid salts such as $LiClO_4$, $LiBrO_4$, and $LiIO_4$, and inorganic chloride salt such as $LiAlCl_4$.

Examples of the fluorine-containing organic lithium salt include: perfluoroalkane sulfonate such as $LiCF_3SO_3$; perfluoroalkane sulfonylimide salts such as $LiN(CF_3SO_2)_2$, $LiN(CF_3CF_2SO_2)_2$, and $LiN(CF_3SO_2)(C_4F_9SO_9)$; perfluoroalkane sulfonylmethide salt such as $LiC(CF_3SO_2)_3$; fluoroalkyl fluorophosphates salts such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$; and others.

Examples of the oxalatoborate salts include lithium bis(oxalato)borate, lithium difluoro oxalatoborate, and others.

One lithium salt among these may be used independently, or two or more lithium salts may be used in combination. Among them, lithium hexafluorophosphate ($LiPF_6$) is preferred when solubility for solvent, charging/discharging characteristics in the case of a secondary battery, output characteristics, cycle characteristics, and others are comprehensively considered.

A preferred example of using two or more kinds of lithium salts is the combined use of $LiPF_6$ and $LiBF_4$. In this case, a percentage of $LiBF_4$ to the sum total of both is preferably 0.01 wt. % or more and 20 wt. % or less, and more preferably 0.1 wt. % or more and 5 wt. % or less. Also, another preferred example is the combined use of inorganic fluoride salt and perfluoroalkane sulfonylimide salt, and in this case, a percentage of the inorganic fluoride salt to the sum total of both is preferably 70 wt. % or more and 99 wt. % or less, and more preferably 80 wt. % or more and 98 wt. % or less. According to the two preferred examples mentioned above, characteristic deterioration due to high temperature preservation can be suppressed.

The concentration of electrolyte in the nonaqueous electrolytic solution is not particularly limited, and the ranges of the concentration of electrolyte are as follows. That is, the lower limit of the concentration is 0.5 mol/L or more, preferably 0.6 mol/L or more, and more preferably 0.7 mol/L or more. Also, the upper limit of the concentration is 2 mol/L or less, preferably 1.8 mol/L or less, and more preferably 1.7 mol/L or less. When the concentration is too low, there is fear that an electric conductivity of the electrolytic solution becomes insufficient. Also, when the concentration is too high, there is fear that the electric conductivity is lowered because the viscosity is increased. The performance of the lithium ion battery may be lowered due to the deterioration of the electric conductivity like this.

The nonaqueous solvent is not particularly limited as long as it is nonaqueous solvent which can be used as the solvent of electrolyte for lithium ion batteries, and examples thereof include cyclic carbonate, chain carbonate, chain ester, cyclic ether, and chain ether described below.

As the cyclic carbonate, cyclic carbonate whose carbon number of an alkylene group constituting the cyclic carbonate is 2 to 6 is preferred, and cyclic carbonate whose carbon number thereof is 2 to 4 is more preferred. Specific examples thereof include ethylene carbonate, propylene carbonate, butylene carbonate, and others. Among them, ethylene carbonate and propylene carbonate are preferred.

As the chain carbonate, dialkyl carbonate is preferred, and chain carbonate whose carbon numbers of two alkyl groups are respectively 1 to 5 is preferred, and chain carbonate whose carbon numbers thereof are 1 to 4 is more preferred. Specific examples thereof include symmetric chain carbonates such as dimethyl carbonate, diethyl carbonate, and di-n-propyl carbonate; asymmetric chain carbonates such as ethyl methyl carbonate, methyl-n-propyl carbonate, and ethyl-n-propyl carbonate; and others. Among them, dimethyl carbonate, diethyl carbonate, and ethyl methyl carbonate are preferred.

Examples of chain esters include methyl acetate, ethyl acetate, propyl acetate, methyl propionate, and others. Among them, it is preferred to use the methyl acetate from a viewpoint of the improvement in low-temperature characteristics.

Examples of cyclic ether include tetrahydrofuran, 2-methyl tetrahydrofuran, tetrahydropyran, and others. Among them, it is preferred to use tetrahydrofuran from a viewpoint of the improvement in input/output characteristics.

Examples of chain ether include dimethoxyethane, dimethoxymethane, and others.

One material of these may be independently used and two or more materials may be used in combination, but it is preferred to use a mixed solvent in which two or more kinds of compounds are used together. For example, it is preferred to use high dielectric constant solvent of cyclic carbonates and low viscosity solvent such as chain carbonates and chain esters together. One of preferred combinations is the combination where cyclic carbonates and the chain carbonates are main constituents. Among them, the combination in which the sum total of the cyclic carbonates and the chain carbonates to the nonaqueous solvent is 80 vol. % or more, preferably 85 vol. % or more, and more preferably 90 vol. % or more, and the volume of the cyclic carbonates to the sum total of the cyclic carbonates and the chain carbonates is within the following ranges is preferred. The lower limit of a volume of the cyclic carbonates is 5% or more, preferably 10% or more, and more preferably 15% or more, and the upper limit is 50% or less, preferably 35% or less, and more preferably 30% or less. By using the combination of nonaqueous solvents like this, cycle characteristics and high temperature preservation characteristics of the battery (in particular, remaining capacity after high temperature preservation and a high-load-discharging capacity) are enhanced.

Specific examples of the preferred combinations of the cyclic carbonates and the chain carbonates include: ethylene carbonate and dimethyl carbonate; ethylene carbonate and diethyl carbonate; ethylene carbonate and ethyl methyl carbonate; ethylene carbonate, dimethyl carbonate and diethyl carbonate; ethylene carbonate, dimethyl carbonate and ethyl methyl carbonate; ethylene carbonate, diethyl carbonate and ethyl methyl carbonate; ethylene carbonate, dimethyl carbonate, diethyl carbonate and ethyl methyl carbonate; and others.

Combinations obtained by further adding propylene carbonate to these combinations of ethylene carbonates and chain carbonates are also included as preferred combinations. In the case where propylene carbonate is contained therein, a volume ratio of the ethylene carbonate and the propylene carbonate is preferably 99:1 to 40:60, and more preferably 95:5 to 50:50. Furthermore, the ranges of the amount of propylene carbonate contained in the nonaqueous solvent are as follows. That is, the lower limit of the amount of propylene carbonate is 0.1 vol. % or more, preferably 1 vol. % or more, and more preferably 2 vol. % or more, and the upper limit is 10 vol. % or less, preferably 8 vol. % or less, and more preferably 5 vol. % or less.

According to the combination like this, low-temperature characteristics can be further enhanced, while maintaining the characteristics obtained from the combination between the ethylene carbonates and the chain carbonates.

Among these combinations, those containing asymmetric chain carbonates as the chain carbonates are further preferred. Specific examples thereof include: ethylene carbonate, dimethyl carbonate and ethyl methyl carbonate; ethylene carbonate, diethyl carbonate and ethyl methyl carbonate; and ethylene carbonate, dimethyl carbonate, diethyl carbonate and ethyl methyl carbonate. By the combination of ethylene carbonates, symmetric chain carbonates, and asymmetric chain carbonates as described above, cycle characteristics and large current discharging characteristics can be enhanced. Among them, the combination in which the asymmetric chain carbonates are ethyl methyl carbonate are preferred, and the combination in which the carbon number of an alkyl group constituting the dialkyl carbonate is 1 to 2 is preferred.

Other examples of preferred mixed solvents are those which contain the chain ester. In particular, the one which contains the chain ester in the above-mentioned mixed solvent of cyclic carbonates and chain carbonates is preferred from a viewpoint of enhancing low-temperature characteristics of the battery. As the chain ester, methyl acetate and ethyl acetate are particularly preferred. The lower limit of a volume of the chain ester contained in the nonaqueous solvent is 5% or more, preferably 8% or more, and more preferably 15% or more, and the upper limit is 50% or less, preferably 35% or less, more preferably 30% or less, and still more preferably 25% or less.

Another preferred example of nonaqueous solvent is one kind of organic solvent selected from a group including ethylene carbonate, propylene carbonate, and butylene carbonate, or mixed solvent composed of two or more kinds of organic solvents selected from this group, and the volume of this mixed solvent in the nonaqueous solvent is set to 60 vol. % or more. The mixed solvent like this is preferably adjusted by selecting the various types of solvents so that a flashing point becomes 50° C. or higher, and especially, it is more preferred that the mixed solvent is adjusted so that the flashing point becomes 70° C. or higher. In the nonaqueous electrolytic solution using the mixed solvent like this, even when used at a high temperature, evaporation and liquid leakage of the solvent are reduced. Especially, when the one in which the sum total of ethylene carbonate and propylene carbonate contained in the nonaqueous solvent is 80 vol. % or more, and preferably 90 vol. % or more and a volume ratio between the ethylene carbonate and the propylene carbonate is 30:70 to 60:40 is used, cycle characteristics, large current discharging characteristics and others can be enhanced.

The additive is not particularly limited as long as it is the additive for the nonaqueous electrolytic solution of the lithium ion battery, and examples thereof include heterocyclic compound containing nitrogen, sulfur, or nitrogen and sulfur, cyclic carboxylic acid ester, fluorine-containing cyclic carbonate, and other compounds having unsaturated bonding within a molecule.

The heterocyclic compound containing nitrogen, sulfur, or nitrogen and sulfur is not particularly limited, and examples thereof include: pyrrolidinones such as 1-methyl-2-pyrrolidinone, 1,3-dimethyl-2-pyrrolidinone, 1,5-dimethyl-2-pyrrolidinone, 1-ethyl-2-pyrrolidinone, and 1-cyclohexyl-2-pyrrolidinone; oxazolidinones such as 3-methyl-2-oxazolidinone, 3-ethyl-2-oxazolidinone, and 3-cyclohexyl-2-oxazolidinone; piperidones such as 1-methyl-2-piperidone and 1-ethyl-2-piperidone; imidazolidinones such as 1,3-dimethyl-2-imidazolidinone and 1,3-diethyl-2-imidazolidinone; sulfolanes such as sulfolane, 2-methyl sulfolane, and 3-methyl sulfolane; sulfolene; sulfites such as ethylene sulfite and propylene sulfite; and sultones such as 1,3-propane sultone, 1-methyl-1,3-propane sultone, 3-methyl-1,3-propane sultone, 1,4-butane sultone, 1,3-propene sultone, and 1,4-butene sultone; and others. Among them, 1-methyl-2-pyrrolidinone, 1-methyl-2-piperidone, 1,3-propane sultone, 1,4-butane sultone, 1,3-propene sultone, and the 1,4-butene sultone and others are particularly preferred from a viewpoint of the extension of the battery life.

The cyclic carboxylic acid ester is not particularly limited, and examples thereof include γ-butyrolactone, γ-valerolactone, γ-hexalactone, γ-heptalactone, γ-octalactone, γ-nonalactone, γ-decalactone, γ-undecalactone, γ-dodecalactone, α-methyl-γ-butyrolactone, α-ethyl-γ-butyrolactone, α-propyl-γ-butyrolactone, α-methyl-γ-valerolactone, α-ethyl-γ-valerolactone, α,α-dimethyl-γ-butyrolactone, α,α-dimethyl-γ-valerolactone, δ-valerolactone, δ-hexalactone, δ-octalactone, δ-nonalactone, δ-decalactone, δ-undecalactone, δ-dodecalactone, and others. Among them, γ-butyrolactone, γ-valerolactone and the like are particularly preferred from a viewpoint of the extension of the battery life.

The fluorine-containing cyclic carbonate is not particularly limited, and examples thereof include fluoroethylene carbonate, difluoroethylene carbonate, trifluoroethylene carbonate, tetrafluoroethylene carbonate, trifluoropropylene carbonate, and others. Among them, fluoroethylene carbonate or the like is particularly preferred from a viewpoint of the extension of the battery life.

Examples of other compounds having unsaturated bonding within a molecule include: carbonates such as vinylene carbonate, vinylethylene carbonate, divinylethylene carbonate, methylvinyl carbonate, ethylvinyl carbonate, propylvinyl carbonate, divinyl carbonate, allylmethyl carbonate, allylethyl carbonate, allylpropyl carbonate, diarylcarbonate, and dimethallyl carbonate; esters such as vinyl acetate, vinyl propionate, vinyl acrylate, vinyl crotonate, vinyl methacrylate, allyl acetate, allyl propionate, methyl acrylate, ethyl acrylate, propyl acrylate, methyl methacrylate, ethyl methacrylate, and propyl methacrylate; sulfones such as divinyl sulfone, methylvinyl sulfone, ethylvinyl sulfone, propylvinyl sulfone, diaryl sulfone, allylmethyl sulfone, allylethyl sulfone, and allylpropyl sulfone; sulfites such as divinyl sulfite, methylvinyl sulfite, ethylvinyl sulfite, and diaryl sulfite; sulfonates such as vinylmethane sulfonate, vinylethane sulfonate, allylmethane sulfonate, allylethane sulfonate, methylvinyl sulfonate, and ethylvinyl sulfonate; sulfates such as divinyl sulfate, methylvinyl sulfate, ethylvinyl sulfate, and diaryl sulfate; and others. Among them, vinylene carbonate, dimethallyl carbonate, vinyl ethylene carbonate, divinyl ethylene carbonate, vinyl acetate, vinyl propionate, vinyl acrylate, divinyl sulfone, vinylmethane sulfonate, and others are particularly preferred from a viewpoint of the extension of the battery life.

Other than the above-mentioned additives, other additives such as an overcharging prevention material, a negative electrode coating material, a positive electrode protection material, a high input/output material may be used in accordance with desired functions.

Examples of the overcharging prevention material include: aromatic compounds such as biphenyl, alkyl biphenyl, terphenyl, partially hydrogenated terphenyl, cyclohexylbenzene, t-butylbenzene, t-amylbenzene, diphenyl ether, and dibenzofuran; partially fluorinated compounds of the above-mentioned aromatic compounds such as 2-fluorobiphenyl, o-cyclohexyl fluorobenzene, and p-cyclohexyl fluorobenzene; fluorine-containing anisole compounds such as 2,4-difluoro anisole, 2,5-difluoro anisole, 2,6-difluoro anisole, and 3,5-difluoro anisole; and others. Among them, aromatic compounds such as biphenyl, alkyl biphenyl, terphenyl, partially hydrogenated terphenyl, cyclohexylbenzene, t-butylbenzene, t-amylbenzene, diphenyl ether, and dibenzofuran are preferred. Two or more kinds of these overcharging prevention materials may be used together. When two or more kinds are used together, it is particularly preferred to use cyclohexylbenzene or terphenyl (or partially hydrogenated compound thereof) together with t-butylbenzene or t-amylbenzene.

Examples of the negative electrode coating material include succinic anhydride, glutaric anhydride, maleic anhydride, citraconic anhydride, glutaconic anhydride, itaconic anhydride, cyclohexanedicarboxylic anhydride, and others. Among them, succinic anhydride and maleic anhydride are preferred. Two or more kinds of these negative electrode coating materials may be used together.

Examples of the positive electrode protection material include dimethyl sulfoxide, diethyl sulfoxide, dimethyl sulfite, diethyl sulfite, methyl methanesulfonate, busulfan, toluenesulfonic acid methyl, dimethyl sulfate, diethyl sulfate, dimethylsulfone, diethyl sulfone, diphenylsulfide, thioanisole, diphenyldisulfide, and others. Among them, methyl methanesulfonate, busulfan, and dimethylsulfone are preferred. Two or more kinds of these positive electrode protection materials may be used together.

Examples of the high input/output material include: ammonium salt, potassium salt, or lithium salt of perfluoroalkyl sulfonate and perfluoroalkyl carboxylate; surface active agents such as perfluoroalkyl polyoxyethylene ether and fluorinated alkyl ester; and others. Among them, perfluoroalkyl polyoxyethylene ether and fluorinated alkyl ester are preferred.

The percentage of the additives in the nonaqueous electrolytic solution is not particularly limited, and the ranges thereof are as follows. Note that, in the case of using a plurality of additives, they indicate the percentages of respective additives. That is, the lower limit of the percentage of the additive for the nonaqueous electrolytic solution is preferably 0.01 wt. % or more, more preferably 0.1 wt. % or more, and still more preferably 0.2 wt. % or more, and the upper limit is preferably 5 wt. % or less, more preferably 3 wt. % or less, and still more preferably 2 wt. % or less.

By means of the above-mentioned other additives, for example, it is possible to suppress an abrupt electrode reaction in an abnormal state due to overcharging, enhance the capacity maintenance characteristics and cycle characteristics after high temperature preservation, and enhance the input/output characteristics.

4. Separator

The separator is not particularly limited as long as it has ionic permeability while electronically insulating the positive electrode and the negative electrode, and is provided with resistance against oxidization on the positive electrode side and reduction on the negative electrode side. As materials (substances) for the separator which satisfy the characteristics mentioned above, for example, resin, inorganic substance, and glass fiber are used.

As the resin, olefin-based polymer, fluorine-based polymer, cellulose-based polymer, polyimide, nylon, and others are used. Specifically, it is preferred to select from materials which are stable for the nonaqueous electrolytic solution and excellent in solution retention, and porous sheet, nonwoven fabric or the like using polyolefin such as polyethylene or polypropylene as a raw material is preferably used.

As the inorganic substance, oxides such as alumina and silicon dioxide, nitrides such as aluminum nitride and silicon nitride, sulfates such as barium sulfate and calcium sulfate, and others are used. For example, it is possible to use the separator obtained by adhering the above-mentioned inorganic substance in fiber shape or particle shape to a base material in a thin film shape such as nonwoven fabric, woven fabric, and fine porous film. As the base material in a thin film shape, one whose pore diameter is 0.01 to 1 µm and thickness is 5 to 50 µm is suitably used. Also, for example, the one which is made of the above-mentioned inorganic substance in the fiber shape or particle shape and formed into a composite porous layer by using a binding material such as resin can be used as the separator. Furthermore, it is also possible to form the separator by forming this composite porous layer on the surface of the positive electrode or the negative electrode. For example, a composite porous layer obtained by binding alumina particles whose 90% particle size is less than 1 µm by using a fluororesin as a binding material may be formed on the surface of the positive electrode.

5. Other Constituent Parts

A cleavage valve may be provided as other constituting part of the lithium ion battery. By opening the cleavage valve, a pressure rise inside the battery can be suppressed, and safety can be enhanced.

Also, a component part which discharges an inert gas (for example, carbon dioxide) in association with temperature increase may be provided. By providing the component part like this, it becomes possible to promptly open the cleavage valve by the generation of the inert gas when a temperature inside the battery is increased, and the safety can be enhanced. Examples of the material used for the above-mentioned component part include lithium carbonate, polyalkylene carbonate resin, and others. Examples of polyalkylene carbonate resin include polyethylene carbonate, polypropylene carbonate, poly(1,2-dimethyl ethylene carbonate), polybutene carbonate, polyisobutene carbonate, polypentene carbonate, polyhexene carbonate, polycyclopentene carbonate, polycyclohexene carbonate, polycycloheptene carbonate, polycyclooctane carbonate, polylimonene carbonate, and others. As the materials used for the above-mentioned component part, lithium carbonate, polyethylene carbonate, and polypropylene carbonate are preferred.

EXAMPLE

Hereinafter, the embodiment will be described in more detail based on examples. Note that the present invention is not limited to the following examples.

[Fabrication of Positive Electrode Plate]

The positive electrode plate was fabricated in the following manner. Layered lithium nickel manganese cobalt composite oxide (NMC) and olivine lithium iron phosphate (LFP) as positive electrode active materials were mixed with a predetermined weight ratio (NMC/LFP) of the active materials. A scale-like graphite (average particle diameter: 20 µm) as a conducting material and polyvinylidene fluoride as an binding material were sequentially added into this mixture of positive electrode active materials and then mixed, thereby obtaining a mixture of positive electrode materials. The weight ratio of the active material, the conducting material, and the binding material was set to 90:5:5. Furthermore, N-methyl-2-pyrrolidone (NMP) as a dispersing solvent was added to the above-mentioned mixture and then kneaded, thereby forming a slurry. This slurry was applied substantially evenly and uniformly by a specified quantity to both surfaces of an aluminum foil having a thickness of 20 µm serving as the current collector for the positive electrode. The aluminum foil had a rectangular shape whose shorter side (width) was 350 mm, and an uncoated portion with a 50 mm width was left along one long side. Thereafter, a drying process was performed and consolidation was carried out by pressing to obtain a predetermined density. Then, a positive electrode plate having a width of 350 mm was acquired by cutting. At this time, cutouts were formed in the above-mentioned uncoated portion, and the cutout remainder was provided as a lead piece. The width of the lead piece was set to 10 mm, and the interval between adjacent lead pieces was set to 20 mm.

[Fabrication of Negative Electrode Plate]

The negative electrode plate was fabricated in the following manner. Amorphous carbon was used as the negative electrode active material. Specifically, a brand name of CARBOTRON P (powder) manufactured by Kureha Chemical Industry Co., Ltd. was used. Polyvinylidene fluoride was added as a binding material to this amorphous carbon. The weight ratio of the active material and the binding material was set to 92:8. N-methyl-2-pyrrolidone (NMP) as a dispersing solvent was added thereto and then kneaded, thereby forming a slurry. This slurry was applied substantially evenly and uniformly by a specified quantity to both surfaces of rolled copper foil having a thickness of 10 µm serving as the current collector for the negative electrode. The rolled copper foil had a rectangular shape whose shorter side (width) was 355 mm, and an uncoated portion with a 50 mm width was left along one long side. Thereafter, a drying process was performed and consolidation was carried out by pressing to obtain a predetermined density. The negative electrode composite density was set to 1.0 g/cm$^3$. Then, a negative electrode plate having a width of 355 mm was acquired by cutting. At this time, cutouts were formed in the above-mentioned uncoated portion, and the cutout remainder was provided as a lead piece. The width of the lead piece was set to 10 mm, and the interval between adjacent lead pieces was set to 20 mm.

[Fabrication of Battery]

FIG. 1 shows a cross-sectional view of the lithium ion battery. The above-mentioned positive electrode plate and the above-mentioned negative electrode plate were wound with interposing a separator made of polyethylene having a thickness of 30 μm therebetween so that these were not in direct contact with each other. At this time, the lead pieces of the positive electrode plate and the lead pieces of the negative electrode plate were made to be located at both end faces on the mutually opposite sides of the wound group. In addition, the lengths of the positive electrode plate, the negative electrode plate, and the separator were adjusted so that the diameter of the wound group was set to 65±0.1 mm or 40±0.1 mm.

Subsequently, as shown in FIG. 1, the lead pieces 9 derived from the positive electrode plate were transformed, and all of them were gathered in the vicinity of a bottom part of a flange 7 on the positive electrode side and were made to be contacted. The flange 7 on the positive electrode side was integrally formed so as to project from the circumference of an electrode post (positive electrode external terminal 1) located approximately on the extension line of an axis of the wound group 6, and had a bottom part and a side part. After that, the lead piece 9 was connected and fixed to the bottom part of the flange 7 by ultrasonic welding. The lead pieces 9 derived from the negative electrode plate and a bottom part of the flange 7 on the negative electrode side were connected and fixed in the same manner. The flange 7 on the negative electrode side was integrally formed so as to project from the circumference of an electrode post (negative electrode external terminal 1') located approximately on the extension line of the axis of the wound group 6, and had a bottom part and a side part.

Thereafter, the side part of the flange 7 of the positive electrode external terminal 1 and the side part of the flange 7 of the negative electrode external terminal 1' were covered by using adhesive tape, thereby forming an insulating coating 8. In the same way, the insulating coating 8 was formed also on the outer circumference of the wound group 6. For example, this adhesive tape was wound over and over again from the side part of the flange 7 on the positive electrode external terminal 1 side to the outer circumferential surface of the wound group 6 and from the outer circumferential surface of the wound group 6 to the side part of the flange 7 on the negative electrode external terminal 1' side, thereby forming the insulating coating 8. As the insulating coating (adhesive tape) 8, an adhesive tape whose base material was polyimide and whose one surface was coated with an adhesive material made of hexamethacrylate was used. The thickness of the insulating coating (the number of turns of the adhesive tape) was adjusted so that the maximum diameter part of the wound group 6 was slightly smaller than an inner diameter of a battery container 5 made of stainless steel, and the wound group 6 was inserted into the battery container 5. As for the battery container 5, the container whose outer diameter was 67 mm or 42 mm and whose inner diameter was 66 mm or 41 mm was used.

Subsequently, as shown in FIG. 1, a ceramic washer 3' was fitted to each of an electrode post whose tip constituted the positive electrode external terminal 1 and an electrode post whose tip constituted the negative electrode external terminal 1'. The ceramic washer 3' was made of alumina, and a thickness of a part abutting on the back surface of a battery lid 4 was 2 mm, the inner diameter was 16 mm, and the outer diameter was 25 mm. Subsequently, in a state where the ceramic washer 3 was placed on the battery lid 4, the positive electrode external terminal 1 was placed through the ceramic washer 3, and in a state where the other ceramic washer 3 was placed on the other battery lid 4, the negative electrode external terminal 1' was placed through the other ceramic washer 3. The ceramic washer 3 was made of alumina and had a plate-like shape with a thickness of 2 mm, an inner diameter of 16 mm, and an outer diameter of 28 mm.

Thereafter, a peripheral end face of the battery lid 4 was fitted to an opening of the battery container 5, and the whole area of the contact portion therebetween was laser-welded. At this time, each of the positive electrode external terminal 1 and the negative electrode external terminal 1' penetrated through a hole (opening) located in the center of the battery lid 4, and projected to the outside of the battery lid 4. On the battery lid 4, a cleavage valve 10 cleaved in accordance with internal pressure rise of the battery was provided. The cleaving pressure of the cleavage valve 10 was set to 13 to 18 kgf/cm$^2$.

Subsequently, as shown in FIG. 1, a metal washer 11 was fitted to each of the positive electrode external terminal 1 and the negative electrode external terminal 1'. In this manner, the metal washer 11 was arranged on the ceramic washer 3. The metal washer 11 was made of a material smoother than a bottom surface of a nut 2.

Subsequently, a metal nut 2 was screwed on each of the positive electrode external terminal 1 and the negative electrode external terminal 1', and the battery lid 4 was fastened tightly and fixed between the flange 7 and the nut 2 via the ceramic washer 3, the metal washer 11, and the ceramic washer 3'. At this time, a fastening torque value was set to 70 kgf·cm. Note that the metal washer 11 did not rotate until fastening work was completed. In this state, power generation elements inside the battery container 5 were isolated from the outside air by the compression of an O-ring 12 made of rubber (EPDM) interposed between the back surface of the battery lid 4 and the flange 7.

Thereafter, an electrolytic solution was poured into the battery container 5 by a specified quantity from a pouring port 13 provided in the battery lid 4, and then the pouring port 13 was sealed, thereby completing a cylindrical lithium ion battery 20.

As the electrolytic solution, the solution in which lithium hexafluorophosphate (LiPF$_6$) was dissolved by 1.2 mol/L into a mixed solution obtained by mixing ethylene carbonate, dimethyl carbonate, and ethyl methyl carbonate by a volume ratio of 2:3:2 was used. Note that, in the cylindrical lithium ion battery 20 fabricated in the present example, a current cutoff mechanism which operates so as to cut off the current in accordance with the rise of an internal pressure of the battery container 5 was not provided.

[Evaluation of Battery Characteristics (Discharge Characteristics and Safety (Nail Penetration Test))]

Battery characteristics of the lithium ion battery fabricated in the above-mentioned manner were evaluated by using the methods shown below.

Regarding the fabricated lithium ion batteries, discharging characteristics and safety of the batteries each having different positive electrode composite densities, positive electrode composite application quantities, and weight ratios (NMC/LFP) of the layered lithium nickel manganese cobalt composite oxide (NMC) and the olivine lithium iron phosphate (LFP) were evaluated.

In a discharge test for evaluating the discharge characteristics, first, the charging and discharging cycle with a current value of 0.5 C was repeated twice under an environment of 25° C. in a voltage range of 4.2 to 2.0 V. Then, after charging the battery up to 4.2 V, discharging by constant current discharging with a final voltage of 2.0 V was performed at each current value of 0.5 C or 3 C.

In addition, safety was confirmed by the nail penetration test.

In the nail penetration test, first, the charging and discharging cycle with a current value of 0.5 C was repeated twice under an environment of 25° C. in a voltage range of 4.2 to 2.0 V. Then, after charging the battery up to 4.2 V, a nail having a diameter of 5 mm was pierced into the central part of the battery (cell) at a speed of 1.6 mm/s, and the positive electrode and the negative electrode were short-circuited in the battery container. The variation of an external appearance of the battery at this time was checked.

Examples 1 to 100

As indicated in Tables 1 to 4, the positive electrode composites each having different weight ratios (NMC/LFP) of the active materials, positive electrode composite densities, and positive electrode composite application quantities were fabricated, and the batteries having a wound group diameter of 40 mm, an outer diameter of 42 mm, and an inner diameter of 41 mm were fabricated. Discharge capacity at each current value (0.5 C and 3 C), volume energy density at a current value of 0.5 C, output characteristics (discharge capacity at a current value of 3 C/discharge capacity at a current value of 0.5 C), and safety (nail penetration test) were evaluated. Specifically, an existence of a breakage of the battery container was checked. The breakage of the battery container included a crack, a swelling, and an ignition.

Table 1 to Table 4 show the results. Note that arrows (↑) indicating an upward direction means that it is the same numerical value or result as the upper column. As for the results of the nail penetration test, the result of the case where there was no breakage of the battery container (except a nailed part) was evaluated as "OK (good)", and the result of the case where the breakage of the battery container occurred was evaluated as "NG (NO good)". The mark "○" in the Tables indicates that the result was "OK" in the nail penetration test. Also, the mark "x" in the Tables indicates that the result was "NG" in the nail penetration test. These notations are the same also in the other tables.

Examples 101 to 180

As indicated in Table 5 to Table 7, the positive electrode composites each having different weight ratios (NMC/LFP) of the active materials, positive electrode composite densities, and positive electrode composite application quantities were fabricated, and the batteries having a wound group diameter of 65 mm, an outer diameter of 67 mm, and an inner diameter of 66 mm were fabricated. Discharge capacity at each current value (0.5 C and 3 C), volume energy density at a current value of 0.5 C, output characteristics (discharge capacity at a current value of 3 C/discharge capacity at a current value of 0.5 C), and safety (nail penetration test) were evaluated. Table 5 to Table 7 show the results.

Examples 181 to 185

As indicated in Table 8, the positive electrode composites each having different weight ratios (NMC/LFP) of the active materials, positive electrode composite densities, and positive electrode composite application quantities were fabricated, and the batteries having a wound group diameter of 65 mm, an outer diameter of 67 mm, and an inner diameter of 66 mm were fabricated. In the Examples 181 to 185, as the negative electrode active material, a graphitic material such as artificial graphite was used instead of amorphous carbon used in the Examples 1 to 180. Discharge capacity at each current value (0.5 C and 3 C), volume energy density at a current value of 0.5 C, output characteristics (discharge capacity at a current value of 3 C/discharge capacity at a current value of 0.5 C), and safety (nail penetration test) were evaluated. Table 8 shows the results.

Comparative Example 1

As indicated in Table 9, the positive electrode composite having the weight ratio (NMC/LFP) of the active materials of 10/90, the positive electrode composite density of 1.9 g/cm$^3$, and the positive electrode composite application quantity of 80 g/m$^2$ was fabricated, and the battery having a wound group diameter of 40 mm, an outer diameter of 42 mm, and an inner diameter of 41 mm was fabricated. Discharge capacity at each current value (0.5 C and 3 C), volume energy density at a current value of 0.5 C, output characteristics (discharge capacity at a current value of 3 C/discharge capacity at a current value of 0.5 C), and safety (nail penetration test) were evaluated. Table 9 shows the results.

Comparative Examples 2 to 6

As indicated in Table 10, the positive electrode composites each having different weight ratios (NMC/LFP) of the active materials, positive electrode composite densities, and positive electrode composite application quantities were fabricated, and the batteries having a wound group diameter of 65 mm, an outer diameter of 67 mm, and an inner diameter of 66 mm were fabricated. Discharge capacity at each current value (0.5 C and 3 C), volume energy density at a current value of 0.5 C, output characteristics (discharge capacity at a current value of 3 C/discharge capacity at a current value of 0.5 C), and safety (nail penetration test) were evaluated. Table 10 shows the results.

Comparative Examples 7 to 10

As indicated in Table 11, the positive electrode composites each having different weight ratios (NMC/LFP) of the active materials, positive electrode composite densities, and positive electrode composite application quantities were fabricated, and the batteries having a wound group diameter of 65 mm, an outer diameter of 67 mm, and an inner diameter of 66 mm were fabricated. In the Comparative Examples 7 to 10, as the negative electrode active material, the above-mentioned graphitic material was used like the Examples 181 to 185. Discharge capacity at each current value (0.5 C and 3 C), volume energy density at a current value of 0.5 C, output characteristics (discharge capacity at a current value of 3 C/discharge capacity at a current value of 0.5 C), and safety (nail penetration test) were evaluated. Table 11 shows the results.

TABLE 1

| Example | NMC/ LFP | Positive electrode composite density (g/cm³) | Application quantity of positive electrode composite (g/m²) | Diameter of wound group (mm) | Outer diameter (mm) | Inner diameter (mm) | Discharge capacity (Ah) @ 0.5 C | Discharge capacity (Ah) @ 3.0 C | Output characteristics | Volume energy density (Wh/L) @ 0.5 C | Safety |
|---|---|---|---|---|---|---|---|---|---|---|---|
| 1 | 10/90 | 2.0 | 100 | 40 | 42 | 41 | 30 | 29 | 0.97 | 165 | ○ |
| 2 | ↑ | ↑ | 125 | ↑ | ↑ | ↑ | 31 | 30 | 0.96 | 172 | ↑ |
| 3 | ↑ | ↑ | 150 | ↑ | ↑ | ↑ | 32 | 30 | 0.94 | 174 | ↑ |
| 4 | ↑ | ↑ | 175 | ↑ | ↑ | ↑ | 32 | 29 | 0.88 | 179 | ↑ |
| 5 | ↑ | ↑ | 200 | ↑ | ↑ | ↑ | 33 | 27 | 0.82 | 181 | ↑ |
| 6 | ↑ | 2.2 | 100 | ↑ | ↑ | ↑ | 31 | 30 | 0.99 | 170 | ↑ |
| 7 | ↑ | ↑ | 125 | ↑ | ↑ | ↑ | 32 | 31 | 0.98 | 177 | ↑ |
| 8 | ↑ | ↑ | 150 | ↑ | ↑ | ↑ | 33 | 32 | 0.96 | 181 | ↑ |
| 9 | ↑ | ↑ | 175 | ↑ | ↑ | ↑ | 34 | 30 | 0.90 | 186 | ↑ |
| 10 | ↑ | ↑ | 200 | ↑ | ↑ | ↑ | 35 | 30 | 0.86 | 191 | ↑ |
| 11 | 20/80 | 2.2 | 100 | ↑ | ↑ | ↑ | 32 | 31 | 0.97 | 177 | ↑ |
| 12 | ↑ | ↑ | 125 | ↑ | ↑ | ↑ | 33 | 32 | 0.96 | 181 | ↑ |
| 13 | ↑ | ↑ | 150 | ↑ | ↑ | ↑ | 33 | 31 | 0.93 | 184 | ↑ |
| 14 | ↑ | ↑ | 175 | ↑ | ↑ | ↑ | 34 | 29 | 0.86 | 188 | ↑ |
| 15 | ↑ | ↑ | 200 | ↑ | ↑ | ↑ | 35 | 29 | 0.83 | 191 | ↑ |
| 16 | ↑ | 2.4 | 100 | ↑ | ↑ | ↑ | 33 | 33 | 0.99 | 181 | ↑ |
| 17 | ↑ | ↑ | 125 | ↑ | ↑ | ↑ | 34 | 33 | 0.98 | 186 | ↑ |
| 18 | ↑ | ↑ | 150 | ↑ | ↑ | ↑ | 35 | 33 | 0.95 | 191 | ↑ |
| 19 | ↑ | ↑ | 175 | ↑ | ↑ | ↑ | 36 | 32 | 0.88 | 198 | ↑ |
| 20 | ↑ | ↑ | 200 | ↑ | ↑ | ↑ | 37 | 32 | 0.86 | 202 | ↑ |
| 21 | 30/70 | 2.2 | 100 | ↑ | ↑ | ↑ | 35 | 34 | 0.97 | 191 | ↑ |
| 22 | ↑ | ↑ | 125 | ↑ | ↑ | ↑ | 36 | 34 | 0.96 | 198 | ↑ |
| 23 | ↑ | ↑ | 150 | ↑ | ↑ | ↑ | 37 | 33 | 0.90 | 202 | ↑ |
| 24 | ↑ | ↑ | 175 | ↑ | ↑ | ↑ | 38 | 32 | 0.84 | 207 | ↑ |
| 25 | ↑ | ↑ | 200 | ↑ | ↑ | ↑ | 39 | 32 | 0.82 | 212 | ↑ |
| 26 | ↑ | 2.3 | 100 | ↑ | ↑ | ↑ | 35 | 34 | 0.98 | 191 | ↑ |
| 27 | ↑ | ↑ | 125 | ↑ | ↑ | ↑ | 36 | 35 | 0.97 | 198 | ↑ |
| 28 | ↑ | ↑ | 150 | ↑ | ↑ | ↑ | 37 | 34 | 0.91 | 205 | ↑ |
| 29 | ↑ | ↑ | 175 | ↑ | ↑ | ↑ | 38 | 32 | 0.85 | 209 | ↑ |
| 30 | ↑ | ↑ | 200 | ↑ | ↑ | ↑ | 39 | 33 | 0.85 | 214 | ↑ |

TABLE 2

| Example | NMC/ LFP | Positive electrode composite density (g/cm³) | Application quantity of positive electrode composite (g/m²) | Diameter of wound group (mm) | Outer diameter (mm) | Inner diameter (mm) | Discharge capacity (Ah) @ 0.5 C | Discharge capacity (Ah) @ 3.0 C | Output characteristics | Volume energy density (Wh/L) @ 0.5 C | Safety |
|---|---|---|---|---|---|---|---|---|---|---|---|
| 31 | 30/70 | 2.4 | 100 | 40 | 42 | 41 | 36 | 36 | 0.99 | 198 | ○ |
| 32 | ↑ | ↑ | 125 | ↑ | ↑ | ↑ | 37 | 36 | 0.98 | 202 | ↑ |
| 33 | ↑ | ↑ | 150 | ↑ | ↑ | ↑ | 38 | 35 | 0.92 | 209 | ↑ |
| 34 | ↑ | ↑ | 175 | ↑ | ↑ | ↑ | 39 | 33 | 0.86 | 214 | ↑ |
| 35 | ↑ | ↑ | 200 | ↑ | ↑ | ↑ | 40 | 33 | 0.83 | 219 | ↑ |
| 36 | ↑ | 2.5 | 100 | ↑ | ↑ | ↑ | 36 | 36 | 0.98 | 200 | ↑ |
| 37 | ↑ | ↑ | 125 | ↑ | ↑ | ↑ | 38 | 36 | 0.97 | 207 | ↑ |
| 38 | ↑ | ↑ | 150 | ↑ | ↑ | ↑ | 38 | 35 | 0.91 | 212 | ↑ |
| 39 | ↑ | ↑ | 175 | ↑ | ↑ | ↑ | 40 | 34 | 0.85 | 219 | ↑ |
| 40 | ↑ | ↑ | 200 | ↑ | ↑ | ↑ | 41 | 34 | 0.83 | 223 | ↑ |
| 41 | 40/60 | 2.2 | 100 | ↑ | ↑ | ↑ | 36 | 34 | 0.96 | 198 | ↑ |
| 42 | ↑ | ↑ | 125 | ↑ | ↑ | ↑ | 37 | 35 | 0.95 | 202 | ↑ |
| 43 | ↑ | ↑ | 150 | ↑ | ↑ | ↑ | 38 | 33 | 0.89 | 207 | ↑ |
| 44 | ↑ | ↑ | 175 | ↑ | ↑ | ↑ | 38 | 32 | 0.83 | 209 | ↑ |
| 45 | ↑ | ↑ | 200 | ↑ | ↑ | ↑ | 39 | 32 | 0.82 | 212 | ↑ |
| 46 | ↑ | 2.3 | 100 | ↑ | ↑ | ↑ | 36 | 35 | 0.97 | 198 | ↑ |
| 47 | ↑ | ↑ | 125 | ↑ | ↑ | ↑ | 37 | 36 | 0.96 | 205 | ↑ |
| 48 | ↑ | ↑ | 150 | ↑ | ↑ | ↑ | 38 | 35 | 0.90 | 212 | ↑ |
| 49 | ↑ | ↑ | 175 | ↑ | ↑ | ↑ | 40 | 33 | 0.84 | 219 | ↑ |
| 50 | ↑ | ↑ | 200 | ↑ | ↑ | ↑ | 42 | 34 | 0.81 | 225 | ↑ |
| 51 | ↑ | 2.4 | 100 | ↑ | ↑ | ↑ | 37 | 36 | 0.98 | 202 | ↑ |
| 52 | ↑ | ↑ | 125 | ↑ | ↑ | ↑ | 38 | 36 | 0.97 | 207 | ↑ |
| 53 | ↑ | ↑ | 150 | ↑ | ↑ | ↑ | 39 | 35 | 0.91 | 214 | ↑ |
| 54 | ↑ | ↑ | 175 | ↑ | ↑ | ↑ | 40 | 34 | 0.85 | 221 | ↑ |
| 55 | ↑ | ↑ | 200 | ↑ | ↑ | ↑ | 41 | 35 | 0.85 | 223 | ↑ |
| 56 | ↑ | 2.5 | 100 | ↑ | ↑ | ↑ | 38 | 37 | 0.97 | 209 | ↑ |
| 57 | ↑ | ↑ | 125 | ↑ | ↑ | ↑ | 39 | 37 | 0.96 | 214 | ↑ |
| 58 | ↑ | ↑ | 150 | ↑ | ↑ | ↑ | 40 | 36 | 0.90 | 221 | ↑ |
| 59 | ↑ | ↑ | 175 | ↑ | ↑ | ↑ | 41 | 34 | 0.84 | 226 | ↑ |
| 60 | ↑ | ↑ | 200 | ↑ | ↑ | ↑ | 42 | 35 | 0.83 | 231 | ↑ |

TABLE 3

| Example | NMC/ LFP | Positive electrode composite density (g/cm³) | Application quantity of positive electrode composite (g/m²) | Diameter of wound group (mm) | Outer diameter (mm) | Inner diameter (mm) | Discharge capacity (Ah) @ 0.5 C | Discharge capacity (Ah) @ 3.0 C | Output characteristics | Volume energy density (Wh/L) @ 0.5 C | Safety |
|---|---|---|---|---|---|---|---|---|---|---|---|
| 61 | 50/50 | 2.3 | 100 | 40 | 42 | 41 | 38 | 35 | 0.94 | 207 | ○ |
| 62 | ↑ | ↑ | 125 | ↑ | ↑ | ↑ | 38 | 35 | 0.93 | 209 | ↑ |
| 63 | ↑ | ↑ | 150 | ↑ | ↑ | ↑ | 39 | 34 | 0.87 | 214 | ↑ |
| 64 | ↑ | ↑ | 175 | ↑ | ↑ | ↑ | 40 | 32 | 0.81 | 219 | ↑ |
| 65 | ↑ | ↑ | 200 | ↑ | ↑ | ↑ | 41 | 32 | 0.78 | 222 | ↑ |
| 66 | ↑ | 2.4 | 100 | ↑ | ↑ | ↑ | 38 | 36 | 0.95 | 207 | ↑ |
| 67 | ↑ | ↑ | 125 | ↑ | ↑ | ↑ | 39 | 36 | 0.94 | 214 | ↑ |
| 68 | ↑ | ↑ | 150 | ↑ | ↑ | ↑ | 40 | 35 | 0.88 | 219 | ↑ |
| 69 | ↑ | ↑ | 175 | ↑ | ↑ | ↑ | 41 | 33 | 0.82 | 223 | ↑ |
| 70 | ↑ | ↑ | 200 | ↑ | ↑ | ↑ | 42 | 34 | 0.81 | 226 | ↑ |
| 71 | ↑ | 2.5 | 100 | ↑ | ↑ | ↑ | 38 | 37 | 0.96 | 212 | ↑ |
| 72 | ↑ | ↑ | 125 | ↑ | ↑ | ↑ | 39 | 37 | 0.95 | 216 | ↑ |
| 73 | ↑ | ↑ | 150 | ↑ | ↑ | ↑ | 40 | 36 | 0.89 | 221 | ↑ |
| 74 | ↑ | ↑ | 175 | ↑ | ↑ | ↑ | 41 | 34 | 0.83 | 228 | ↑ |
| 75 | ↑ | ↑ | 200 | ↑ | ↑ | ↑ | 42 | 35 | 0.83 | 232 | ↑ |
| 76 | ↑ | 2.6 | 100 | ↑ | ↑ | ↑ | 39 | 37 | 0.95 | 216 | ↑ |
| 77 | ↑ | ↑ | 125 | ↑ | ↑ | ↑ | 40 | 38 | 0.94 | 221 | ↑ |
| 78 | ↑ | ↑ | 150 | ↑ | ↑ | ↑ | 41 | 36 | 0.88 | 226 | ↑ |
| 79 | ↑ | ↑ | 175 | ↑ | ↑ | ↑ | 42 | 34 | 0.82 | 230 | ↑ |
| 80 | ↑ | ↑ | 200 | ↑ | ↑ | ↑ | 43 | 35 | 0.81 | 233 | ↑ |
| 81 | 60/40 | 2.3 | 100 | ↑ | ↑ | ↑ | 41 | 38 | 0.92 | 226 | ↑ |
| 82 | ↑ | ↑ | 125 | ↑ | ↑ | ↑ | 42 | 38 | 0.91 | 230 | ↑ |
| 83 | ↑ | ↑ | 150 | ↑ | ↑ | ↑ | 43 | 36 | 0.85 | 235 | ↑ |
| 84 | ↑ | ↑ | 175 | ↑ | ↑ | ↑ | 43 | 34 | 0.79 | 240 | ↑ |
| 85 | ↑ | ↑ | 200 | ↑ | ↑ | ↑ | 44 | 34 | 0.77 | 245 | ↑ |
| 86 | ↑ | 2.4 | 100 | ↑ | ↑ | ↑ | 41 | 38 | 0.93 | 228 | ↑ |
| 87 | ↑ | ↑ | 125 | ↑ | ↑ | ↑ | 43 | 39 | 0.92 | 235 | ↑ |
| 88 | ↑ | ↑ | 150 | ↑ | ↑ | ↑ | 44 | 38 | 0.86 | 242 | ↑ |
| 89 | ↑ | ↑ | 175 | ↑ | ↑ | ↑ | 45 | 36 | 0.80 | 249 | ↑ |
| 90 | ↑ | ↑ | 200 | ↑ | ↑ | ↑ | 46 | 37 | 0.80 | 254 | ↑ |

TABLE 4

| Example | NMC/ LFP | Positive electrode composite density (g/cm³) | Application quantity of positive electrode composite (g/m²) | Diameter of wound group (mm) | Outer diameter (mm) | Inner diameter (mm) | Discharge capacity (Ah) @ 0.5 C | Discharge capacity (Ah) @ 3.0 C | Output characteristics | Volume energy density (Wh/L) @ 0.5 C | Safety |
|---|---|---|---|---|---|---|---|---|---|---|---|
| 91 | 60/40 | 2.5 | 100 | 40 | 42 | 41 | 42 | 39 | 0.94 | 230 | ○ |
| 92 | ↑ | ↑ | 125 | ↑ | ↑ | ↑ | 43 | 40 | 0.93 | 237 | ↑ |
| 93 | ↑ | ↑ | 150 | ↑ | ↑ | ↑ | 45 | 39 | 0.87 | 247 | ↑ |
| 94 | ↑ | ↑ | 175 | ↑ | ↑ | ↑ | 46 | 37 | 0.81 | 253 | ↑ |
| 95 | ↑ | ↑ | 200 | ↑ | ↑ | ↑ | 47 | 37 | 0.79 | 256 | ↑ |
| 96 | ↑ | 2.6 | 100 | ↑ | ↑ | ↑ | 42 | 39 | 0.93 | 233 | ↑ |
| 97 | ↑ | ↑ | 125 | ↑ | ↑ | ↑ | 44 | 40 | 0.92 | 242 | ↑ |
| 98 | ↑ | ↑ | 150 | ↑ | ↑ | ↑ | 45 | 39 | 0.86 | 249 | ↑ |
| 99 | ↑ | ↑ | 175 | ↑ | ↑ | ↑ | 46 | 37 | 0.80 | 256 | ↑ |
| 100 | ↑ | ↑ | 200 | ↑ | ↑ | ↑ | 47 | 37 | 0.79 | 260 | ↑ |

TABLE 5

| Example | NMC/ LFP | Positive electrode composite density (g/cm³) | Application quantity of positive electrode composite (g/m²) | Diameter of wound group (mm) | Outer diameter (mm) | Inner diameter (mm) | Discharge capacity (Ah) @ 0.5 C | Discharge capacity (Ah) @ 3.0 C | Output characteristics | Volume energy density (Wh/L) @ 0.5 C | Safety |
|---|---|---|---|---|---|---|---|---|---|---|---|
| 101 | 10/90 | 2.0 | 100 | 65 | 67 | 66 | 78 | 76 | 0.97 | 176 | ○ |
| 102 | ↑ | ↑ | 125 | ↑ | ↑ | ↑ | 82 | 78 | 0.96 | 183 | ↑ |
| 103 | ↑ | ↑ | 150 | ↑ | ↑ | ↑ | 83 | 78 | 0.94 | 186 | ↑ |
| 104 | ↑ | ↑ | 175 | ↑ | ↑ | ↑ | 85 | 75 | 0.88 | 191 | ↑ |
| 105 | ↑ | ↑ | 200 | ↑ | ↑ | ↑ | 86 | 71 | 0.82 | 194 | ↑ |
| 106 | ↑ | 2.2 | 100 | ↑ | ↑ | ↑ | 80 | 80 | 0.99 | 181 | ↑ |
| 107 | ↑ | ↑ | 125 | ↑ | ↑ | ↑ | 84 | 82 | 0.98 | 188 | ↑ |
| 108 | ↑ | ↑ | 150 | ↑ | ↑ | ↑ | 86 | 83 | 0.96 | 193 | ↑ |
| 109 | ↑ | ↑ | 175 | ↑ | ↑ | ↑ | 88 | 79 | 0.90 | 198 | ↑ |
| 110 | ↑ | ↑ | 200 | ↑ | ↑ | ↑ | 89 | 77 | 0.86 | 201 | ↑ |
| 111 | 20/80 | 2.2 | 100 | ↑ | ↑ | ↑ | 84 | 81 | 0.97 | 188 | ↑ |

TABLE 5-continued

| Example | NMC/ LFP | Positive electrode composite density (g/cm³) | Application quantity of positive electrode composite (g/m²) | Diameter of wound group (mm) | Outer diameter (mm) | Inner diameter (mm) | Discharge capacity (Ah) @ 0.5 C | Discharge capacity (Ah) @ 3.0 C | Output characteristics | Volume energy density (Wh/L) @ 0.5 C | Safety |
|---|---|---|---|---|---|---|---|---|---|---|---|
| 112 | ↑ | ↑ | 125 | ↑ | ↑ | ↑ | 86 | 83 | 0.96 | 193 | ↑ |
| 113 | ↑ | ↑ | 150 | ↑ | ↑ | ↑ | 87 | 81 | 0.93 | 196 | ↑ |
| 114 | ↑ | ↑ | 175 | ↑ | ↑ | ↑ | 89 | 77 | 0.86 | 201 | ↑ |
| 115 | ↑ | ↑ | 200 | ↑ | ↑ | ↑ | 91 | 76 | 0.83 | 205 | ↑ |
| 116 | ↑ | 2.4 | 100 | ↑ | ↑ | ↑ | 86 | 85 | 0.99 | 193 | ↑ |
| 117 | ↑ | ↑ | 125 | ↑ | ↑ | ↑ | 88 | 86 | 0.98 | 198 | ↑ |
| 118 | ↑ | ↑ | 150 | ↑ | ↑ | ↑ | 90 | 86 | 0.95 | 204 | ↑ |
| 119 | ↑ | ↑ | 175 | ↑ | ↑ | ↑ | 94 | 82 | 0.88 | 210 | ↑ |
| 120 | ↑ | ↑ | 200 | ↑ | ↑ | ↑ | 96 | 83 | 0.86 | 217 | ↑ |
| 121 | 30/70 | 2.2 | 100 | ↑ | ↑ | ↑ | 90 | 88 | 0.97 | 204 | ↑ |
| 122 | ↑ | ↑ | 125 | ↑ | ↑ | ↑ | 94 | 90 | 0.96 | 210 | ↑ |
| 123 | ↑ | ↑ | 150 | ↑ | ↑ | ↑ | 96 | 86 | 0.90 | 215 | ↑ |
| 124 | ↑ | ↑ | 175 | ↑ | ↑ | ↑ | 98 | 82 | 0.84 | 220 | ↑ |
| 125 | ↑ | ↑ | 200 | ↑ | ↑ | ↑ | 100 | 82 | 0.82 | 224 | ↑ |
| 126 | ↑ | ↑ | 100 | ↑ | ↑ | ↑ | 90 | 89 | 0.98 | 204 | ↑ |
| 127 | ↑ | ↑ | 125 | ↑ | ↑ | ↑ | 94 | 91 | 0.97 | 210 | ↑ |
| 128 | ↑ | ↑ | 150 | ↑ | ↑ | ↑ | 97 | 88 | 0.91 | 218 | ↑ |
| 129 | ↑ | ↑ | 175 | ↑ | ↑ | ↑ | 99 | 84 | 0.85 | 223 | ↑ |
| 130 | ↑ | ↑ | 200 | ↑ | ↑ | ↑ | 102 | 87 | 0.85 | 230 | ↑ |

TABLE 6

| Example | NMC/ LFP | Positive electrode composite density (g/cm³) | Application quantity of positive electrode composite (g/m²) | Diameter of wound group (mm) | Outer diameter (mm) | Inner diameter (mm) | Discharge capacity (Ah) @ 0.5 C | Discharge capacity (Ah) @ 3.0 C | Output characteristics | Volume energy density (Wh/L) @ 0.5 C | Safety |
|---|---|---|---|---|---|---|---|---|---|---|---|
| 131 | 30/70 | 2.4 | 100 | 65 | 67 | 66 | 94 | 93 | 0.99 | 210 | ○ |
| 132 | ↑ | ↑ | 125 | ↑ | ↑ | ↑ | 96 | 94 | 0.98 | 215 | ↑ |
| 133 | ↑ | ↑ | 150 | ↑ | ↑ | ↑ | 99 | 91 | 0.92 | 223 | ↑ |
| 134 | ↑ | ↑ | 175 | ↑ | ↑ | ↑ | 101 | 87 | 0.86 | 228 | ↑ |
| 135 | ↑ | ↑ | 200 | ↑ | ↑ | ↑ | 103 | 85 | 0.83 | 232 | ↑ |
| 136 | ↑ | 2.5 | 100 | ↑ | ↑ | ↑ | 95 | 93 | 0.98 | 213 | ↑ |
| 137 | ↑ | ↑ | 125 | ↑ | ↑ | ↑ | 98 | 95 | 0.97 | 220 | ↑ |
| 138 | ↑ | ↑ | 150 | ↑ | ↑ | ↑ | 100 | 91 | 0.91 | 226 | ↑ |
| 139 | ↑ | ↑ | 175 | ↑ | ↑ | ↑ | 104 | 88 | 0.85 | 233 | ↑ |
| 140 | ↑ | ↑ | 200 | ↑ | ↑ | ↑ | 106 | 88 | 0.83 | 238 | ↑ |
| 141 | 40/60 | 2.2 | 100 | ↑ | ↑ | ↑ | 94 | 90 | 0.96 | 210 | ↑ |
| 142 | ↑ | ↑ | 125 | ↑ | ↑ | ↑ | 96 | 91 | 0.95 | 215 | ↑ |
| 143 | ↑ | ↑ | 150 | ↑ | ↑ | ↑ | 98 | 87 | 0.89 | 220 | ↑ |
| 144 | ↑ | ↑ | 175 | ↑ | ↑ | ↑ | 99 | 82 | 0.83 | 223 | ↑ |
| 145 | ↑ | ↑ | 200 | ↑ | ↑ | ↑ | 101 | 83 | 0.82 | 226 | ↑ |
| 146 | ↑ | 2.3 | 100 | ↑ | ↑ | ↑ | 94 | 91 | 0.97 | 210 | ↑ |
| 147 | ↑ | ↑ | 125 | ↑ | ↑ | ↑ | 97 | 93 | 0.96 | 218 | ↑ |
| 148 | ↑ | ↑ | 150 | ↑ | ↑ | ↑ | 100 | 90 | 0.90 | 226 | ↑ |
| 149 | ↑ | ↑ | 175 | ↑ | ↑ | ↑ | 104 | 87 | 0.84 | 233 | ↑ |
| 150 | ↑ | ↑ | 200 | ↑ | ↑ | ↑ | 106 | 86 | 0.81 | 238 | ↑ |
| 151 | ↑ | 2.4 | 100 | ↑ | ↑ | ↑ | 96 | 94 | 0.98 | 215 | ↑ |
| 152 | ↑ | ↑ | 125 | ↑ | ↑ | ↑ | 98 | 95 | 0.97 | 220 | ↑ |
| 153 | ↑ | ↑ | 150 | ↑ | ↑ | ↑ | 101 | 92 | 0.91 | 228 | ↑ |
| 154 | ↑ | ↑ | 175 | ↑ | ↑ | ↑ | 105 | 89 | 0.85 | 236 | ↑ |
| 155 | ↑ | ↑ | 200 | ↑ | ↑ | ↑ | 107 | 91 | 0.85 | 239 | ↑ |
| 156 | ↑ | 2.5 | 100 | ↑ | ↑ | ↑ | 99 | 96 | 0.97 | 223 | ↑ |
| 157 | ↑ | ↑ | 125 | ↑ | ↑ | ↑ | 101 | 97 | 0.96 | 228 | ↑ |
| 158 | ↑ | ↑ | 150 | ↑ | ↑ | ↑ | 105 | 94 | 0.90 | 236 | ↑ |
| 159 | ↑ | ↑ | 175 | ↑ | ↑ | ↑ | 107 | 90 | 0.84 | 241 | ↑ |
| 160 | ↑ | ↑ | 200 | ↑ | ↑ | ↑ | 109 | 90 | 0.83 | 246 | ↑ |

TABLE 7

| Example | NMC/ LFP | Positive electrode composite density (g/cm³) | Application quantity of positive electrode composite (g/m²) | Diameter of wound group (mm) | Outer diameter (mm) | Inner diameter (mm) | Discharge capacity (Ah) @ 0.5 C | Discharge capacity (Ah) @ 3.0 C | Output characteristics | Volume energy density (Wh/L) @ 0.5 C | Safety |
|---|---|---|---|---|---|---|---|---|---|---|---|
| 161 | 50/50 | 2.3 | 100 | 65 | 67 | 66 | 98 | 92 | 0.94 | 220 | ○ |
| 162 | ↑ | ↑ | 125 | ↑ | ↑ | ↑ | 99 | 92 | 0.93 | 223 | ↑ |

TABLE 7-continued

| Example | NMC/ LFP | Positive electrode composite density (g/cm³) | Application quantity of positive electrode composite (g/m²) | Diameter of wound group (mm) | Outer diameter (mm) | Inner diameter (mm) | Discharge capacity (Ah) @ 0.5 C | @ 3.0 C | Output characteristics | Volume energy density (Wh/L) @ 0.5 C | Safety |
|---|---|---|---|---|---|---|---|---|---|---|---|
| 163 | ↑ | ↑ | 150 | ↑ | ↑ | ↑ | 101 | 88 | 0.87 | 228 | ↑ |
| 164 | ↑ | ↑ | 175 | ↑ | ↑ | ↑ | 104 | 84 | 0.81 | 233 | ↑ |
| 165 | ↑ | ↑ | 200 | ↑ | ↑ | ↑ | 106 | 83 | 0.78 | 237 | ↑ |
| 166 | ↑ | 2.4 | 100 | ↑ | ↑ | ↑ | 98 | 93 | 0.95 | 220 | ↑ |
| 167 | ↑ | ↑ | 125 | ↑ | ↑ | ↑ | 101 | 95 | 0.94 | 228 | ↑ |
| 168 | ↑ | ↑ | 150 | ↑ | ↑ | ↑ | 104 | 91 | 0.88 | 233 | ↑ |
| 169 | ↑ | ↑ | 175 | ↑ | ↑ | ↑ | 106 | 87 | 0.82 | 238 | ↑ |
| 170 | ↑ | ↑ | 200 | ↑ | ↑ | ↑ | 108 | 87 | 0.81 | 242 | ↑ |
| 171 | ↑ | 2.5 | 100 | ↑ | ↑ | ↑ | 100 | 96 | 0.96 | 226 | ↑ |
| 172 | ↑ | ↑ | 125 | ↑ | ↑ | ↑ | 103 | 97 | 0.95 | 231 | ↑ |
| 173 | ↑ | ↑ | 150 | ↑ | ↑ | ↑ | 105 | 93 | 0.89 | 236 | ↑ |
| 174 | ↑ | ↑ | 175 | ↑ | ↑ | ↑ | 108 | 90 | 0.83 | 242 | ↑ |
| 175 | ↑ | ↑ | 200 | ↑ | ↑ | ↑ | 108 | 90 | 0.83 | 242 | ↑ |
| 176 | ↑ | 2.6 | 100 | ↑ | ↑ | ↑ | 103 | 97 | 0.95 | 231 | ↑ |
| 177 | ↑ | ↑ | 125 | ↑ | ↑ | ↑ | 105 | 98 | 0.94 | 236 | ↑ |
| 178 | ↑ | ↑ | 150 | ↑ | ↑ | ↑ | 107 | 94 | 0.88 | 241 | ↑ |
| 179 | ↑ | ↑ | 175 | ↑ | ↑ | ↑ | 109 | 90 | 0.81 | 245 | ↑ |
| 180 | ↑ | ↑ | 200 | ↑ | ↑ | ↑ | 112 | 88 | 0.79 | 251 | ↑ |

TABLE 8

| Example | NMC/ LFP | Positive electrode composite density (g/cm³) | Application quantity of positive electrode composite (g/m²) | Diameter of wound group (mm) | Outer diameter (mm) | Inner diameter (mm) | Discharge capacity (Ah) @ 0.5 C | @ 3.0 C | Output characteristics | Volume energy density (Wh/L) @ 0.5 C | Safety |
|---|---|---|---|---|---|---|---|---|---|---|---|
| 181 | 10/90 | 2.2 | 175 | 65 | 67 | 66 | 115 | 106 | 0.89 | 260 | ○ |
| 182 | 20/80 | 2.4 | 150 | ↑ | ↑ | ↑ | 120 | 109 | 0.91 | 271 | ↑ |
| 183 | 30/70 | ↑ | ↑ | ↑ | ↑ | ↑ | 124 | 119 | 0.96 | 277 | ↑ |
| 184 | 40/60 | 2.6 | 100 | ↑ | ↑ | ↑ | 122 | 117 | 0.96 | 275 | ↑ |
| 185 | 50/50 | ↑ | ↑ | ↑ | ↑ | ↑ | 125 | 119 | 0.95 | 281 | ↑ |

TABLE 9

| Comparative Example | NMC/ LFP | Positive electrode composite density (g/cm³) | Application quantity of positive electrode composite (g/m²) | Diameter of wound group (mm) | Outer diameter (mm) | Inner diameter (mm) | Discharge capacity (Ah) @ 0.5 C | @ 3.0 C | Output characteristics | Volume energy density (Wh/L) @ 0.5 C | Safety |
|---|---|---|---|---|---|---|---|---|---|---|---|
| 1 | 10/90 | 1.9 | 80 | 40 | 42 | 41 | 26 | 18 | 0.70 | 143 | ○ |

TABLE 10

| Comparative Example | NMC/ LFP | Positive electrode composite density (g/cm³) | Application quantity of positive electrode composite (g/m²) | Diameter of wound group (mm) | Outer diameter (mm) | Inner diameter (mm) | Discharge capacity (Ah) @ 0.5 C | @ 3.0 C | Output characteristics | Volume energy density (Wh/L) @ 0.5 C | Safety |
|---|---|---|---|---|---|---|---|---|---|---|---|
| 2 | 50/50 | 2.7 | 200 | 65 | 67 | 66 | 113 | 79 | 0.70 | 256 | x |
| 3 | ↑ | 2.6 | 225 | ↑ | ↑ | ↑ | 115 | 75 | 0.65 | 258 | ↑ |
| 4 | 70/30 | ↑ | 200 | ↑ | ↑ | ↑ | 121 | 66 | 0.55 | 274 | ↑ |
| 5 | 80/20 | ↑ | ↑ | ↑ | ↑ | ↑ | 128 | 69 | 0.54 | 286 | ↑ |
| 6 | 90/10 | ↑ | ↑ | ↑ | ↑ | ↑ | 138 | 73 | 0.53 | 309 | ↑ |

TABLE 11

| Comparative Example | NMC/ LFP | Positive electrode composite density (g/cm³) | Application quantity of positive electrode composite (g/m²) | Diameter of wound group (mm) | Outer diameter (mm) | Inner diameter (mm) | Discharge capacity (Ah) @ 0.5 C | Discharge capacity (Ah) @ 3.0 C | Output characteristics | Volume energy density (Wh/L) @ 0.5 C | Safety |
|---|---|---|---|---|---|---|---|---|---|---|---|
| 7 | 20/80 | 2.4 | 175 | 65 | 67 | 66 | 132 | 117 | 0.89 | 291 | x |
| 8 | 30/70 | ↑ | ↑ | ↑ | ↑ | ↑ | 135 | 126 | 0.93 | 302 | ↑ |
| 9 | 40/60 | 2.6 | 150 | ↑ | ↑ | ↑ | 142 | 129 | 0.91 | 312 | ↑ |
| 10 | 50/50 | ↑ | ↑ | ↑ | ↑ | ↑ | 146 | 136 | 0.93 | 319 | ↑ |

Regarding Examples 1 to 185 indicated in Table 1 to Table 8, it was confirmed that battery characteristics were enhanced in comparison with Comparative Examples 1 to 10 indicated in Table 9 to Table 11. Hereinafter, these will be described in detail.

When Example 1 of Table 1 is compared with Comparative Example 1 of Table 9, it turns out that, even if the weight ratio (NMC/LFP) of the active materials is the same at 10/90 in both Examples, the discharge capacity and the volume energy density are increased by increasing the positive electrode composite density and the positive electrode composite application quantity. In addition, it turns out that output characteristics are also improved by increasing the positive electrode composite density from 1.9 g/cm³ to 2.0 g/cm³.

Also, when Example 180 of Table 7 is compared with Comparative Example 2 of Table 10, it turns out that, even if the weight ratio (NMC/LFP) of the active materials is the same at 50/50 and the positive electrode composite application quantity is the same at 200 g/m² in both Examples, safety can be guaranteed by decreasing the positive electrode composite density from 2.7 g/cm³ to 2.6 g/cm³.

Further, when Example 180 of Table 7 is compared with Comparative Example 3 of Table 10, it turns out that, even if the weight ratio (NMC/LFP) of the active materials is the same at 50/50 and the positive electrode composite density is the same at 2.6 g/m³ in both Examples, safety can be guaranteed by decreasing the positive electrode composite application quantity from 225 g/cm² to 200 g/cm².

Furthermore, when Example 180 of Table 7 is compared with Comparative Examples 4 to 6 of Table 10, it turns out that, even if the positive electrode composite density is the same at 2.6 g/cm³ and the positive electrode composite application quantity is the same at 200 g/m² in these Examples, safety can be guaranteed by setting a percentage of the layered lithium nickel manganese cobalt composite oxide (NMC) in the mixed active material to 50 wt. % or less that is less than 70 wt. %.

Also, as shown by Examples 181 to 185 of Table 8, it turns out that, even if a graphitic material is used as the negative electrode active material instead of amorphous carbon, it does not affect the safety of the battery.

FIG. 2 is a graph showing the relation of the discharge capacity and the weight ratio of the active materials. Specifically, regarding Examples 1 to 185 and Comparative Examples 1 to 10, a relation between the discharge capacity X in the horizontal axis and the weight ratio Y (NMC/LFP) of the active materials in the vertical axis is plotted. A straight line in the figure is the straight line which satisfies the following relational expression 2.

$$Y=-0.0067X+1.84 \quad \text{(relational expression 2)}$$

In the graph of FIG. 2, since the discharge capacities X at a current value of 0.5 C of Examples 1 to 185 are 30 Ah or more and 125 Ah or less and are located in a region below the relational expression 2, they satisfy the following relational expression 1.

$$Y<-0.0067X+1.84 (30 \leq X \leq 125) \quad \text{(relational expression 1)}$$

Meanwhile, Comparative Examples 1 and 199 4 do not satisfy the relational expression 1, and since weight ratios Y of Comparative Examples 5 and 6 exceed 3.0, they do not satisfy the relational expression 1 though not shown in FIG. 2.

Also, the positive electrode composite densities of Comparative Examples 7 to 10 are within the range from 2.0 to 2.6 g/cm³ and the positive electrode composite application quantities thereof are within the range from 100 to 200 g/m², but the discharge capacities X at a current value of 0.5 C thereof exceed the range from 30 Ah or more and 125 Ah or less, and they do not satisfy the relational expression 1.

Note that, although Comparative Example 2 and Comparative Example 3 satisfy the relational expression 1, the positive electrode composite density of Comparative Example 2 exceeds the range from 2.0 to 2.6 g/cm³, and the positive electrode composite application quantity of Comparative Example 3 exceeds the range from 100 to 200 g/m².

From the results above, it has been found that, as the lithium ion battery having a discharge capacity of 30 Ah or more and 125 Ah or less, when the positive electrode composite density is set to 2.0 to 2.6 g/cm³, the positive electrode composite application quantity is set to 100 to 200 g/m², and the weight ratio (NMC/LFP) of the active materials is set to 10/90 to 60/40, the battery having a high battery capacity, which is excellent in output characteristics and volume energy density and can guarantee the safety, can be acquired. Furthermore, it has been found that the safer lithium ion battery can be acquired when the discharge capacity X and the weight ratio Y (NMC/LFP) of the active materials satisfy the above-described relational expression 1.

Furthermore, in the present embodiment, a preferred percentage of the positive electrode active material to the positive electrode composite is 85 wt. % or more and 95 wt. % or less. When the percentage of the positive electrode active material to the positive electrode composite is low, although it is possible to guarantee the safety of the battery, the volume energy density is lowered. In addition, when the percentage of the positive electrode active material to the positive electrode composite is high, although it is possible to guarantee the safety of the battery, output characteristics are lowered. In contrast, by securing the percentage of the positive electrode active material within the above-mentioned range, capacity can be increased while securing the safety, and input/output characteristics can be enhanced.

Also, when the percentage of the positive electrode active material is set to 85 wt. % or more and 95 wt. % or less, the range of the conducting material and the binding material capable of being mixed into the positive electrode composite is 5 wt. % or more and 15 wt. % or less relative to the positive electrode composite. Also in the case where the conducting material and the binding material are adjusted so as to be within the range mentioned above, each function can be sufficiently exerted. For example, according to the studies by the inventors of the present invention, in the present embodiment, an effect of the conducting material is increased at 3 wt. % or more and is saturated at about 7 wt. %. Therefore, the contained amount of the conducting material in the present embodiment is sufficient if it is in the range of 3 wt. % or more and 7 wt. % or less. Furthermore, the contained amount of the binding material in the present embodiment is sufficient if it is in the range of 3 wt. % or more and 10 wt. % or less. In other words, while securing the specified percentage of the positive electrode active material, the conducting material and the binding material can be adjusted in the effective range.

In this way, also in the case where the percentage of the positive electrode active material to the positive electrode composite is set to 85 wt. % or more and 95 wt. % or less, battery characteristics can be enhanced like the above-mentioned examples. In addition, this has been confirmed by other studies by the inventors of the present invention, which are carried out with the different ratios of the active material, the conducting material, and the binding material relative to the positive electrode composite.

In the foregoing, the invention made by the inventors of the present invention has been concretely described based on the embodiments and the examples. However, it is needless to say that the present invention is not limited to the foregoing embodiments and examples and various modifications and alterations can be made within the scope of the present invention.

Also, in the above-mentioned examples and comparative examples, the evaluation was performed without using other safety devices such as a cell controller having the current cutoff mechanism or the like in the evaluation of the safety. However, it is needless to say that further safety measures including the above-mentioned cell controller have been taken in actual products, so that the safety enhancement has been developed in various ways.

INDUSTRIAL APPLICABILITY

The present invention is effectively applied to the lithium ion battery.

EXPLANATION OF REFERENCE SIGNS 1 positive electrode external terminal
1' negative electrode external terminal
2 nut
3 ceramic washer
3' ceramic washer
4 battery lid
5 battery container
6 wound group
7 flange
8 insulating coating
9 lead piece
10 cleavage valve
11 metal washer
12 O-ring
13 pouring port
20 cylindrical lithium ion battery

The invention claimed is:
1. A lithium ion battery having an electrode wound group in which a positive electrode, a negative electrode, and a separator are wound and an electrolytic solution provided in a battery container, a discharge capacity X of the battery being 30 Ah or more and 125 Ah or less,
wherein the positive electrode has a current collector and a positive electrode composite applied to both surfaces of the current collector,
the positive electrode composite contains a mixed active material of layered lithium nickel manganese cobalt composite oxide (NMC) and olivine lithium iron phosphate (LFP),
a density of the positive electrode composite is 2.0 g/cm³ or more and 2.6 g/cm³ or less, and an application quantity of the positive electrode composite is 100 g/m² or more and 200 g/m² or less, and
the discharge capacity X and a weight ratio Y (NMC/LFP) between the layered lithium nickel manganese cobalt composite oxide (NMC) and the olivine lithium iron phosphate (LFP) satisfy:

$$Y \leq -0.0067X + 1.84 (30 \leq X \leq 125).$$

2. A lithium ion battery having an electrode wound group in which a positive electrode, a negative electrode, and a separator are wound and an electrolytic solution provided in a battery container, a discharge capacity of the battery being 30 Ah or more,
wherein the positive electrode has a current collector and a positive electrode composite applied to both surfaces of the current collector,
the positive electrode composite contains a mixed active material of layered lithium nickel manganese cobalt composite oxide (NMC) and olivine lithium iron phosphate (LFP),
a density of the positive electrode composite is 2.0 g/cm³ or more and 2.6 g/cm³ or less, and an application quantity of the positive electrode composite is 100 g/m² or more and 200 g/m² or less, and
a weight ratio (NMC/LFP) between the layered lithium nickel manganese cobalt composite oxide (NMC) and the olivine lithium iron phosphate (LFP) is 10/90 or more and 60/40 or less.

3. The lithium ion battery according to claim 1,
wherein the mixed active material is composed of a mixture of layered lithium nickel manganese cobalt composite oxide represented by a following composition formula 1:

$$Li_{(1+\delta)}Mn_xNi_yCo_{(1-x-y-z)}M_zO_2$$

wherein M is at least one element selected from a group including Ti, Zr, Nb, Mo, W, Al, Si, Ga, Ge, and Sn, and $-0.15 < \delta < 0.15$, $0.1 < x \leq 0.5$, $0.6 < x+y+z \leq 1.0$, and $0 \leq z \leq 0.1$ are satisfied, and
olivine lithium iron phosphate having an olivine crystal structure and represented by a following composition formula 2:

$$LiFe_{1-w}M'_wPO_4$$

wherein M' is at least one transition metal element, and $0 \leq w \leq 0.5$ is satisfied.

4. The lithium ion battery according to claim 2,
wherein the mixed active material is composed of a mixture of layered lithium nickel manganese cobalt composite oxide represented by a following composition formula 1:

$$Li_{(1+\delta)}Mn_xNi_yCo_{(1-x-y-z)}M_zO_2$$

wherein M is at least one element selected from a group including Ti, Zr, Nb, Mo, W, Al, Si, Ga, Ge, and Sn, and $-0.15 < \delta < 0.15$, $0.1 < x \leq 0.5$, $0.6 < x+y+z \leq 1.0$, and $0 \leq z \leq 0.1$ are satisfied), and olivine lithium iron phosphate having an olivine crystal structure and represented by a following composition formula 2, that is:

$$LiFe_{1-w}M'_{w}PO_4$$

wherein M' is at least one transition metal element, and $0 \leq w \leq 0.5$ is satisfied.

* * * * *